United States Patent
Ribet et al.

(10) Patent No.: US 12,390,790 B2
(45) Date of Patent: Aug. 19, 2025

(54) MAGNETIC NANOPARTICLE-COATED POROUS MATERIALS FOR RECOVERY OF CONTAMINANTS

(71) Applicant: Northwestern University, Evanston, IL (US)

(72) Inventors: Stephanie M. Ribet, Kensington, CA (US); Vikas Nandwana, Evanston, IL (US); Vinayak P. Dravid, Glenview, IL (US)

(73) Assignee: Northwestern University, Evanston, IL (US)

( * ) Notice: Subject to any disclaimer, the term of this patent is extended or adjusted under 35 U.S.C. 154(b) by 515 days.

(21) Appl. No.: 17/800,281

(22) PCT Filed: Feb. 24, 2021

(86) PCT No.: PCT/US2021/019324
§ 371 (c)(1),
(2) Date: Aug. 17, 2022

(87) PCT Pub. No.: WO2021/173608
PCT Pub. Date: Sep. 2, 2021

(65) Prior Publication Data
US 2023/0084588 A1    Mar. 16, 2023

Related U.S. Application Data

(60) Provisional application No. 62/980,509, filed on Feb. 24, 2020.

(51) Int. Cl.
*B01J 20/28*    (2006.01)
*B01J 20/32*    (2006.01)
(Continued)

(52) U.S. Cl.
CPC ... *B01J 20/28009* (2013.01); *B01J 20/28083* (2013.01); *B01J 20/28085* (2013.01);
(Continued)

(58) Field of Classification Search
CPC ............ B01J 20/28009; B01J 20/28083; B01J 20/28085; B01J 20/3212; B01J 20/3236;
(Continued)

(56) References Cited

U.S. PATENT DOCUMENTS 9,911,974 B2    3/2018    de Guzman et al.
2003/0224168 A1    12/2003    Mack et al.
(Continued)

FOREIGN PATENT DOCUMENTS

| CN | 103965835 A | 8/2014 |
| KR | 2014 0073720 A | 6/2014 |

(Continued)

OTHER PUBLICATIONS

Paola Calcagnile, et al., Magnetically Driven Floating Foams for the Removal of Oil Contaminants from Water, ACS Nano (2012); vol. 6 (6), 5413-5419 (Year: 2012).*
(Continued)

*Primary Examiner* — Jennifer Dieterle
(74) *Attorney, Agent, or Firm* — Bell & Manning, LLC

(57) ABSTRACT

Magnetic nanoparticle coated porous materials for recovering a contaminant from contaminated water are provided. In embodiments, such a material comprises a porous substrate having a solid matrix defining a plurality of pores distributed through the solid matrix and further comprising a coating comprising magnetic nanoparticles on surfaces of the solid matrix.

14 Claims, 13 Drawing Sheets

(51) Int. Cl.
  *B01J 20/34* (2006.01)
  *C02F 1/28* (2023.01)
  *C02F 1/66* (2023.01)
  *C02F 101/10* (2006.01)
  *C02F 101/16* (2006.01)
(52) U.S. Cl.
  CPC ....... *B01J 20/3212* (2013.01); *B01J 20/3236* (2013.01); *B01J 20/3295* (2013.01); *B01J 20/3475* (2013.01); *C02F 1/288* (2013.01); *C02F 1/66* (2013.01); *C02F 2101/105* (2013.01); *C02F 2101/163* (2013.01); *C02F 2303/16* (2013.01); *C02F 2305/08* (2013.01)
(58) Field of Classification Search
  CPC ................ B01J 20/3295; B01J 20/3475; B01J 20/28028; B01J 20/28057; B01J 20/3425; C02F 1/288; C02F 1/66
  See application file for complete search history.

(56) References Cited

U.S. PATENT DOCUMENTS

| | | | |
|---|---|---|---|
| 2004/0108276 A1 | 6/2004 | Christodoulou | |
| 2009/0198076 A1 | 8/2009 | Guckel | |
| 2011/0058982 A1* | 3/2011 | Kaneko | A61L 2/087 422/22 |
| 2012/0018382 A1 | 1/2012 | Stein | |
| 2013/0284968 A1 | 10/2013 | Azizov et al. | |
| 2015/0194667 A1* | 7/2015 | Chiu | H01G 11/68 210/671 |
| 2015/0217222 A1 | 8/2015 | Hedin et al. | |
| 2016/0204416 A1 | 7/2016 | Wu et al. | |
| 2016/0243523 A1 | 8/2016 | Saini et al. | |
| 2018/0208734 A1 | 7/2018 | Ozkan et al. | |
| 2018/0241032 A1 | 8/2018 | Pan et al. | |
| 2019/0309134 A1* | 10/2019 | Rezaei | C01B 33/1585 |
| 2019/0389744 A1 | 12/2019 | Biris et al. | |
| 2021/0002561 A1* | 1/2021 | Lee | C10G 33/06 |
| 2021/0107792 A1 | 4/2021 | Nandwana et al. | |
| 2022/0059839 A1 | 2/2022 | Nandwana et al. | |
| 2022/0118422 A1 | 4/2022 | Nandwana et al. | |

FOREIGN PATENT DOCUMENTS

| | | | | |
|---|---|---|---|---|
| KR | 10-2018-0037659 A | | 4/2018 | |
| WO | WO-2005074583 A | * | 8/2005 | ............. C02F 1/285 |
| WO | WO 2012/155196 A1 | | 11/2012 | |
| WO | WO 2013022051 A1 | | 2/2013 | |
| WO | WO 2017015648 A1 | | 1/2017 | |
| WO | WO 2020/142261 | | 7/2020 | |
| WO | WO 2020/142267 A1 | | 7/2020 | |

OTHER PUBLICATIONS

Zhiwen Lei, et al., Simple fabrication of multi-functional melamine sponges, Materials Letters, vol. 190 (2017), pp. 119-122, https://doi.org/10.1016/j.matlet.2016.12.082. (Year: 2017).*

Jiang Hu, et al., Facile preparation of durably magnetic superhydrophobic sponge and its application in oil-water separation, Colloids and Surfaces A: Physicochemical and Engineering Aspects, vol. 577 (2019), p. 429-439 (Year: 2019).*

Feng, Yi; Yao, Jianfeng (2018). Design of Melamine Sponge-Based Three-Dimensional Porous Materials toward Applications, Industrial & Engineering Chemistry Research, (2018) 57 (22), p. 7322-7330 (Year: 2018).*

The International Search Report and the Written Opinion issued on Apr. 21, 2021 for international patent application No. PCT/US2021/019324; pp. 1-12.

Calcagnile et al., "Magnetically Driven Floating Foams for the Removal of Oil Contaminants from Water," *ACS Nano*, May 11, 2012, vol. 6, No. 6; pp. 5413-5419.

Guan et al., "Superwetting Polymeric Three Dimensional (3D) Porous Materials for Oil/Water Separation: A Review," *Polymers*, May 6, 2019, vol. 11, No. 806; pp. 1-34.

Lei et al., "Simple fabrication of multi-functional melamine sponges," *Materials Letters* (2017), vol. 190; pp. 119-122.

D. Morillo et al., Poster—"Fe3O4 Nanoparticles-Loaded Cellulose Sponge: Novel system for the Arsenic removal from aqueous solution," TNT2009, Sep. 7-11, 2009, Barcelona-Spain; pp. 1-2.

The extended European Search Report issued on Jan. 26, 2022 for EP Patent Application No. 19907789.2; pp. 1-11.

Bracamonte M. Victoria et al., "Lithium dual uptake anode materials: crystalline Fe3O4 nanoparticles supported over graphite for lithium-ion batteries," *Electrochimica Acta*, Elsevier, Amsterdam, NL, vol. 258, Oct. 7, 2017 (Oct. 7, 2017), pp. 192-199, XP085310877, ISSN: 0013-4686, DOI: 10.1016/J.Electacta.2017.10.034.

Xu Z. et al., "Dispersion of iron nano-particles on expanded graphite for the shielding of electromagnetic radiation," *Journal of Magnetism and Magnetic Materials*, Elsevier, Amsterdam, NL, vol. 322, No. 20, Oct. 1, 2010 (Oct. 1, 2010), pp. 3084-3087, XP027135542, ISSN: 0304-8853 [retrieved on May 25, 2010].

The extended European Search Report issued on Jan. 26, 2022 for EP Patent Application No. 19907115.0; pp. 1-13.

Hamed Hosseini Bay et al., "Scalable Multifunctional Ultra-Thin Graphite Sponge: Free-standing, Superporous, Superhydrophobic, Oleophilic Architecture with Ferromagnetic Properties for Environment Cleaning," *Scientific Reports*, vol. 6, Feb. 24, 2016 (Feb. 24, 2016), pp. 1-9, XP055347982, DOI: 10:1038/srep21858.

Wen Qi et al., "Sandwich-structured nanocomposites of N-doped graphene and nearly monodisperse Fe3O4 nanoparticles as high-performance Li-ion battery anodes," Nano Research 2017, vol. 10, No. 9; pp. 2923-2933.

Lei Zhang et al., "Iron-Oxide-Based Advanced Anode Materials for Lithium-Ion Batteries," Adv. Energy Mater. 2014, vol. 4; pp. 1300958 (1 of 11).

Guangmin Zhou et al., "Graphene-Wrapped Fe3O4 Anode Material with Improved Reversible Capacity and Cyclic Stability for Lithium Ion Batteries," Chem. Mater. 2010, vol. 22; pp. 5306-5313. DOI:10.1021/cm101532x.

Taegyune Yoon et al., "Electrostatic Self-Assembly of Fe3O4 Nanoparticles on Graphene Oxides for High Capacity Lithium-Ion Battery Anodes," Energies 2013, vol. 6; pp. 4830-4840. Doi: 10.3390/en6094830.

Paul M. Winkler et al., "Heterogeneous Nucleation Experiments Bridging the Scale from Molecular Ion Clusters to Nanoparticles," Science Mar. 7, 2008, vol. 319; pp. 1374-1377.

Xiaoyang Pan et al., "Defect-Mediated Growth of Noble-Metal (Ag, Pt, and Pd) Nanoparticles on TiO2 with Oxygen Vacancies for Photocatalytic Redox Reactions under Visible Light," The Journal of Physical Chemistry C 2013, vol. 117; pp. 7996-18005. dx.doi.org/10.1021/jp4064802.

The International Search Report and the Written Opinion issued on Mar. 18, 2020 for International Patent Application No. PCT/US2019/067782; pp. 1-12.

Andrea C. Ferrari, "Raman Spectroscopy of graphene and graphite: Disorder, electron-phonon coupling, doping and nonadiabatic effects," Solid State Communications, vol. 143, Apr. 27, 2007 [retrieved on Feb. 5, 2020]. Retrieved from the Internet, URL: https://pubs.acs.org/doi/abs/10.1021/cm101532x. pp. 5306-5313.

Shanhu Liu et al., "Superhydrophobic/Superoleophilic magnetic polyurethane sponge for oil/water separation†," RSC Adv., 2015, vol. 5; pp. 68293-68298.

Xuemei Zhang et al., "Preparation of Superhydrophobic Magnetic Polyurethane Sponge for Removing Oil Pollutants from Water," IOP Conf. Series: Materials Science and Engineering, 2018, vol. 392, Apr. 2003; pp. 1-7.

Viet-Ha Thi Tran et al., "Novel fabrication of a robust superhydrophobic Pu@ZnO@ Fe3O4@SA sponge and its application in oil-water separations," Scientific Reports, vol. 7, 17520; pp. 1-12. DOI:10.1038/s41598-017-17761-9, Dec. 13, 2017.

M. Anju et al., "Magnetically actuated graphene coated polyurethane foam as potential sorbent for oils and organics," Arabian Journal of Chemistry 2018; pp. 1-11. https://doi.org/10.1016/j.arabjc.2018.01.012.

(56) References Cited

OTHER PUBLICATIONS

Lei Wu et al., "Magnetic, Durable, and Superhydrophobic polyurethane@Fe3O4@SiO2@Fluoropolymer Sponges for Selective Oil Absorption and Oil/Water Separation," ACS Appl. Mater. interfaces 2015, vol. 7; pp. 4936-4946.

Huili Peng et al., "Preparation of Superhydrophobic Magnetic Cellulose Sponge for Removing Oil from Water," Ind. Eng. Chem. Res. 2016, vol. 55; pp. 832-838.

The International Search Report and Written Opinion issued in International Patent Application No. PCT/US18/46674 on Jan. 11, 2019, pp. 1-11.

Liu et al., "Iron Oxide Decorated MoS2 Nanosheets with Double PEGylation for Chelator-Free Radiolabeling and Multimodal Imaging Guided Photothermal Therapy," ACS Nano 2015, vol. 9, No. 1, pp. 950-960.

Nandwana et al., "One-Pot Green Synthesis of Fe3O4/ MoS2 0D/2D Nanocomposites and Their Application in Noninvasive Point-of-Care Glucose Diagnostics," ACS Appl. Nano Mater. 2018, vol. 1, pp. 194901958.

Peng et al., "Ultrathin Two-Dimensional MnO2/Graphene Hybrid Nanostructures for High-Performance, Flexible Planar Supercapacitors," Nano Letters 2013, vol. 13, pp. 2151-2157.

Peng et al., Supporting Information for "Ultrathin Two-Dimensional MnO2/Graphene Hybrid Nanostructures for High-Performance, Flexible Planar Supercapacitors," 2013, pp. 1-11.

Wang et al., "Biosensor Based on Ultrasmall MoS2 Nanoparticles for Electrochemical Detection of H2O2 Released by Cells at the Nanomolar Level," Anal. Chem. 2013, vol. 85, pp. 10289-10295.

Yu et al., "Smart MoS2/ Fe3O4 Nanotheranostic for Magnetically Targeted Photothermal Therapy Guided by Magnetic Resonance/Photoacoustic Imaging," Theranostics 2015, vol. 5, Issue 9, pp. 931-945.

Joensen et al., "Single-Layer MoS2," Mat. Res. Bull. 1986, vol. 21, pp. 457-461.

Zhu et al., "Fast Li Storage in MoS2-Graphene-Carbon Nanotube Nanocomposites: Advantageous Functional Integration of 0D, 1D, and 2D Nanostructures," Adv. Energy Mater. 2015, vol. 5, pp. 1401170-1401177.

V. Nicolosi et al., "Liquid Exfoliation of Layered Materials," Science Jun. 21, 2013, vol. 340, pp. 1226419-1 -1226419-18.

D. Yang et al., "Li-Intercalation and Exfoliation of WS2," J. Phys. Chem. Solids 1996, vol. 57, Nos. 6-8, pp. 1113-1116.

Kufer et al., "Hybrid 2D-0D MoS2—PbS Quantum Dot Photodetectors," Adv. Mater. 2015, vol. 27, pp. 176-180.

Q. Qu et al., "2D Sandwich-like Sheets of Iron Oxide Grown on Graphene as High Energy Anode Material for Supercapacitors," Adv. Mater. 2011, vol. 23, pp. 5574-5580.

Jonathan N. Coleman, "Liquid Exfoliation of Defect-Free Graphene," Accounts of Chemical Research 2013, vol. 46, No. 1, pp. 14-22.

Ahmad et al., "Functionalized Molybdenum Disulfide Nanosheets for OD-2D Hybrid Nanostructures: Photoinduced Charge Transfer and Enhanced Photo response," J. Phys. Chem. Lett. 2017, vol. 8, pp. 1729-1738.

Sandoval et al., "Raman study and lattice dynamics of single molecular layers of MoS2," The American Physical Society Physical Review B Aug. 15 1991—II, vol. 44, No. 8, pp. 3955-3962.

Smith et al., "Large-Scale Exfoliation of Inorganic Layered Compounds in Aqueous Surfactant Solutions," Adv. Mater. 2011, vol. 23, pp. 3944-3948.

Chou et al., "Ligand Conjugation of Chemically Exfoliated MoS2," J. Am. Chem. Soc. 2013, vol. 135, pp. 4584-4587.

Zeeshan Ajmal et al Zeeshan Ajmal et al., "Phosphate removal from aqueous solution using iron oxides: Adsorption, desorption and regeneration characteristics," Journal of Colloid and Interface Science May 2018, vol. 528; pp. 145-155.

Dema A. Almasri et al., Adsorption of phosphate on iron oxide doped halloysite nanotubes, Scientific Reports 2019, vol. 9, 3232; pp. 1-13. https://doi.org/10.1038/s41598-019-39035-2.

Jiang, D., Amano, Y. & Machida, M. Removal and Recovery of Phosphate from Water by a Magnetic Fe3O4@ASC Adsorbent. Journal of Environmental Chemical Engineering 5, 4229-4238 (2017).

Yoon, S. Y. et al. Kinetic, Equilibrium and Thermodynamic Studies for Phosphate Adsorption to Magnetic Iron Oxide Nanoparticles. Chemical Engineering Journal 236, 341-347 (2014).

Choi, J., Chung, J., Lee, W. & Kim, J. O. Phosphorous Adsorption on Synthesized Magnetite in Wastewater. Journal of Industrial and Engineering Chemistry 34, 198-203 (2016).

Zach-Maor, A., Semiat, R. & Shemer, H. Synthesis, Performance, and Modeling of Immobilized Nano-Sized Magnetite Layer for Phosphate Removal. Journal of Colloid and Interface Science 357, 440-446 (2011).

Jung, K. W. & Ahn, K. H. Fabrication of Porosity-Enhanced MgO/biochar for Removal of Phosphate from Aqueous Solution: Application of a Novel Combined Electrochemical Modification Method. Bioresource Technology 200, 1029-1032 (2016).

Ming Hua et al., "Heavy metal removal from water/wastewater by nanosized metal oxides: A review," Journal of Hazardous Materials (2012) 211-212; pp. 317-331. doi: 10.1016/j.jhazmat.2011.10.016.

Fei Ge et al., "Effective removal of heavy metal ions Cd2+, Zn2+, Pb2+, Cu2+ from aqueous solution by polymer-modified magnetic nanoparticles," Journal of Hazardous Materials (2012) 211-212; pp. 366-372.

Narada Bombuwala Dewage et al., Lead (Pb2+) sorptive removal using chitosan-modified biochar: batch and fixed-bed studies†, Jul. 17, 2018.

Yassaman Babaee et al., "Removal of arsenic (III) and arsenic (V) from aqueous solutions through adsorption by Fe/Cu nanoparticles," J Chem Technol. Biotechnol. 2018; 93: pp. 63-71.

Abdulaziz Ali Alghamdi et al., "Efficient Adsorption of Lead (II) from Aqueous Phase Solutions Using Polypyrrole-Based Activated Carbon," Materials 2019, 12, 2020; doi:10.3390/ma12122020; pp. 1-16.

Mingyu Li et al., "Isolated cellulose nanofibers for Cu (II) and Zn (II) removal: performance and mechanisms," Carbohydrate Polymers 221 (2019); pp. 231-241.

Jose Antonio Munoz et al., "Arsenic Adsorption by Fe(III)-Loaded Open-Celled Cellulose Sponge. Thermodynamic and Selectivity Aspects," Environ. Sci. Technol. 2002, 36; pp. 3405-3411.

Shengxiao Zhang et al., "Thiol modified Fe3O4@SiO2 as a robust, high effective, and recycling magnetic sorbent for mercury removal," Chemical Engineering Journal 226 (2013); pp. 30-38.

Wei Zhan et al., "Adsorption of Cu(II), Zn(II), and Pb(II) from aqueous single and binary metal solutions by regenerated cellulose and sodium alginate chemically modified with polyethyleneiminet†," RSC ADV. 2018, 8, 18723-18733.

Dinesh Mohan et al., "Review—Activated carbons and low cost adsorbents for remediation of tri- and hexavalent chromium from water," Journal of Hazardous Materials B137 (2006); pp. 762-811.

Rabia Baby et al., "Carbon Nanomaterials for the Treatment of Heavy Metal-Contaminated Water and Environmental Remediation," Nanoscale Research Letters (2019) 14: 341 https://doi.org/10.1186/s11671-019-3167-8.

Huan Liu et al., "Structural Incorporation of Manganese into Goethite and Its Enhancement of Pb(II) Adsorption," Environ. Sci. Technol. 2018, 52; pp. 4719-4727.

Nidhi Puri et al., "Recent advances on nano-adsorbents and nanomembranes for the remediation of water," Journal of Cleaner Production 322 (2021) 129051; pp. 1-23.

Shalini Rajput et al., "Magnetic magnetite (Fe3O4) nanoparticle synthesis and applications for lead (Pb2+) and chromium (Cr6+) removal from water," Journal of Colloid and Interface Science 468 (2016); pp. 334-346.

K. Rout et al., "Manganese doped goethite: Structural, optical and adsorption properties," Journal of Environmental Chemical Engineering 2 (2014); pp. 434-443.

Shweta Wadhawan et al., "Role of nanomaterials as adsorbents in heavy metal ion removal from waste water: A review," Journal of Water Process Engineering 33 (2020) 101038; pp. 1-17.

(56) References Cited

OTHER PUBLICATIONS

Yihan Wu et al., "Environmental remediation of heavy metal ions by novel-nanomaterials: A review," *Environmental Pollution* 246 (2019); pp. 608-620.
Xiaowen Zhang et al., "Mn-substituted goethite for uranium immobilization: A study of adsorption behavior and mechanisms," *Environmental Pollution* 262 (2020) 114184; pp. 1-11.
Madhu Kumari et al., "Heavy metals [chromium (VI) and lead (II)] removal from water using mesoporous magnetite (Fe3O4) nanospheres," *Journal of Colloid and Interface Science* 442 (2015); pp. 120-132.
Li-Xia Yang et al., "Fabrication and Characterization of Manganese Ferrite Nanospheres as a Magnetic Adsorbent of Chromium," Hindawi Publishing Corporation, *Journal of Nanomaterials*, vol. 2013, Article ID 293464; pp. 1-6. http://dx.doi.org/10.1155/2013/293464.

\* cited by examiner

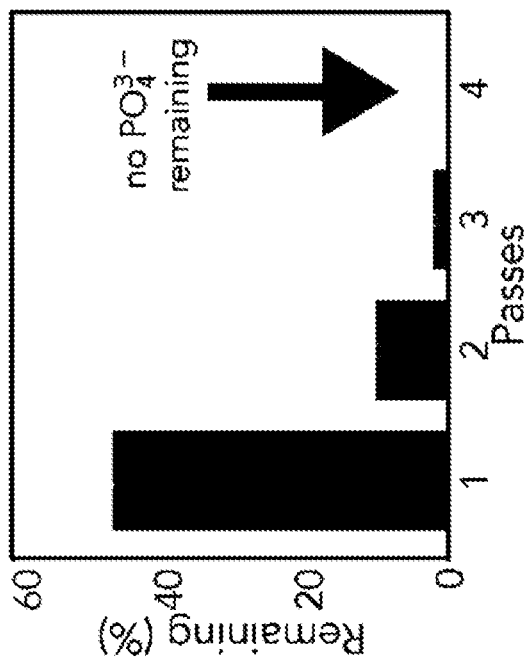
FIG. 7A
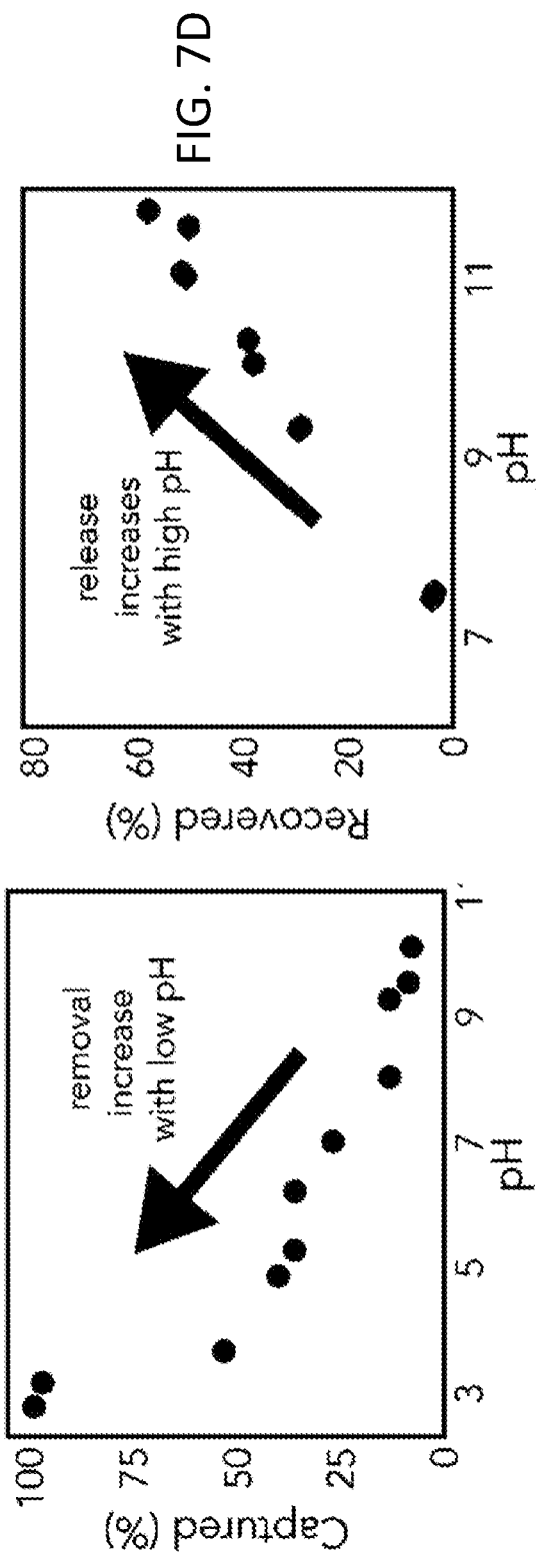
FIG. 7B
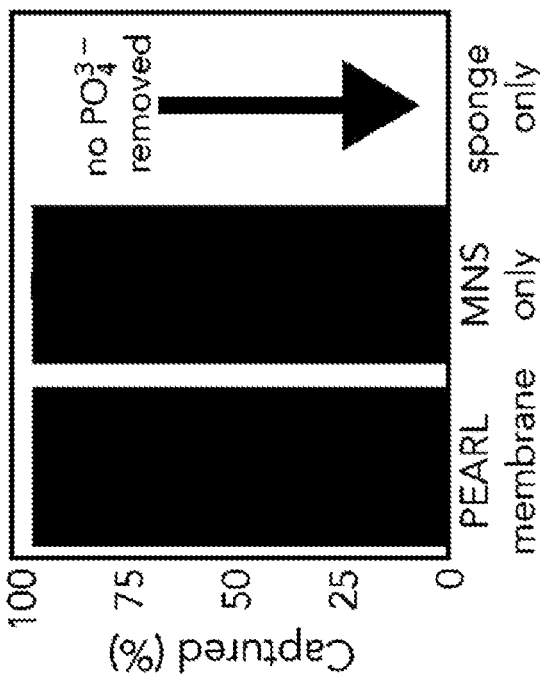
FIG. 7C
FIG. 7D

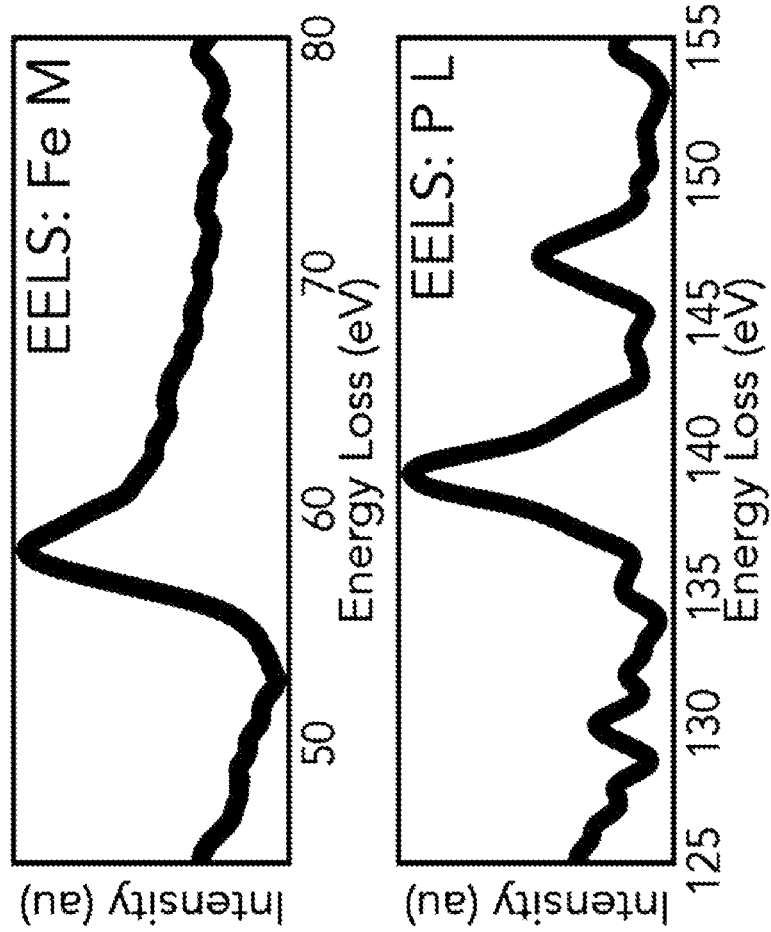

MAGNETIC NANOPARTICLE-COATED POROUS MATERIALS FOR RECOVERY OF CONTAMINANTS

CROSS-REFERENCE TO RELATED APPLICATIONS

The present application is a National Stage of International Application No. PCT/US21/19324, filed Feb. 24, 2021, which claims priority to U.S. provisional patent application No. 62/980,509 that was filed Feb. 24, 2020, the entire contents of both of which are incorporated herein by reference.

BACKGROUND

Anthropogenic hyper-eutrophication, namely excess nutrients released into natural bodies of water from human activity, can have substantial economic, environmental and public health consequences. In the presence of extra phosphates and nitrates, blue-green algae bloom, creating an eyesore, blocking sunlight, producing toxins, and when they die, leading to bacteria proliferation. When bacteria consume dead matter, they use up oxygen, making a dead zone. In the past 15 years, Lake Erie has had algae blooms covering the western basin. In 2014 the algae strain produced the toxin, microcystin, forcing Toledo to shut-off water for its residents for three days. Water treatment plants remove phosphates with a combination of biological and chemical methods, which are expensive, produce secondary pollution, do not recover phosphates, and are ineffective at low concentrations. Recovering and reusing phosphates is important because phosphate fertilizers come from phosphate rock, which is a non-renewable natural resource. This is a gigaton problem that requires at least a megaton solution.

SUMMARY

Provided are magnetic nanoparticle coated porous materials which may be used to recover a variety of contaminants, such as phosphates, from contaminated water. Also provided are methods of making and using the coated porous materials. Regarding phosphate recovery applications, the Examples below demonstrates an iron oxide nanoparticle coated membrane that may be used to remove and recover phosphate from water with high efficiency over multiple cycles (e.g., >99% sequestration and >95% recovery over many cycles). The coated membrane is made from naturally abundant materials (low-cost) and using a scalable water-based synthetic process (environmentally friendly).

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 7A shows demonstrates that the multifunctional nanostructures are the sole contributors to the performance of the PEARL membrane. FIG. 7B shows that after multiple treatments, more than 99% of phosphates can be captured. FIGS. 7C-7D show that removal is pH dependent, so phosphates can be recovered using basic conditions.

FIGS. 8A-8E. XPS curves showing (FIG. 8A) iron (FIG. 8B) phosphorus and (FIG. 8C) oxygen electronic state of nanostructures before interaction with phosphates (MNS), after adsorption (adsorb), and after desorption (desorb). NaOH and $KH_2PO_4$ shown as reference. Line in (FIG. 8A) added to aid the eye. (FIG. 8D) Iron and (FIG. 8E) phosphorus EELS edges confirm binding on the nanoscale.

DETAILED DESCRIPTION

Figure 1:
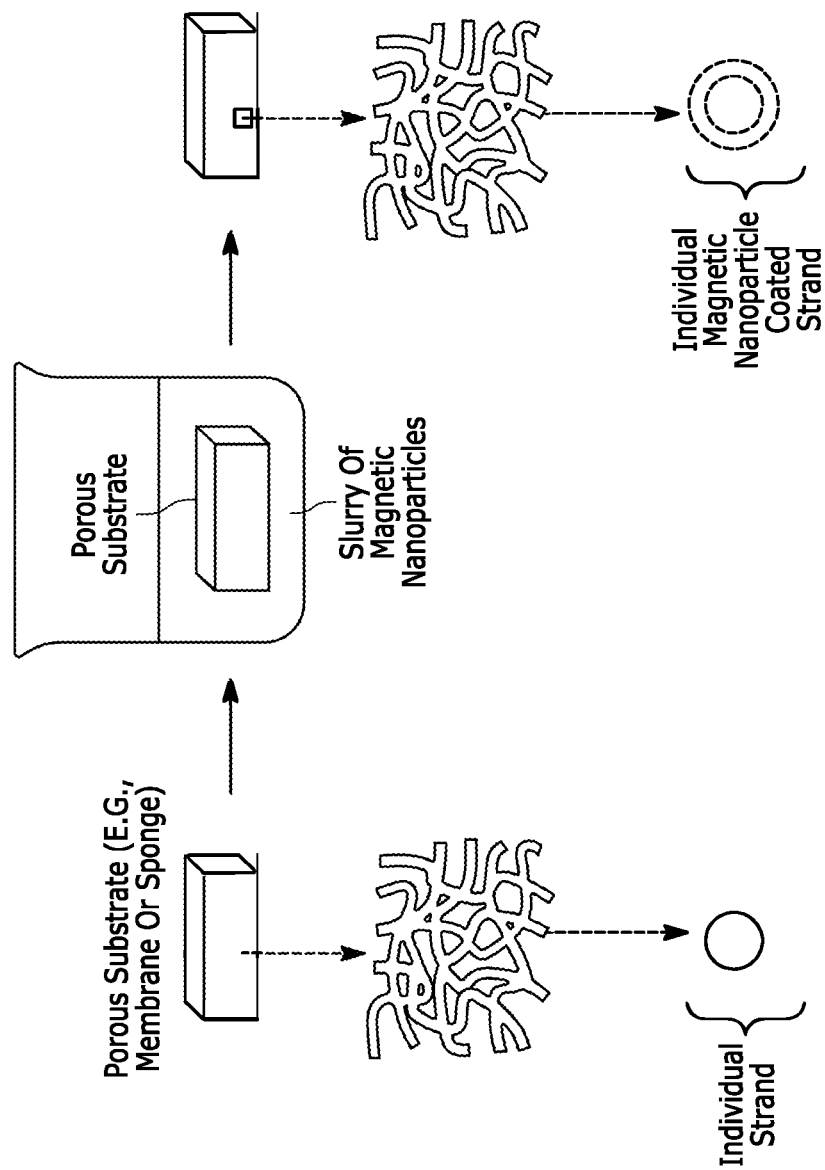
FIG. 1 depicts a schematic of an illustrative process of making a magnetic nanoparticle coated porous material from a porous substrate (e.g., a cellulose membrane or sponge) and a slurry of magnetic nanoparticles (e.g., $Fe_3O_4$ nanoparticles).

Provided are magnetic nanoparticle coated porous materials which may be used to recover a variety of contaminants, such as phosphates, from contaminated water. The magnetic nanoparticle coated porous materials comprise a porous substrate and a coating comprising a plurality of magnetic nanoparticles on surfaces of the porous substrate.

Regarding the magnetic nanoparticles, a variety of magnetic materials may be used. Hard magnetic materials may be used, e.g., CoCrPt, Co, $Co_3Pt$, FePd, FePt, CoPt, CoPd, FeCo, MnAl, $Fe_{14}Nd_2B$, $SmCo_5$. Soft magnetic materials may be used, e.g., $Fe_3O_4$, $MnFe_2O_4$, $NiFe_2O_4$, $MgFe_2O_4$. Other soft magnetic materials include the following soft magnetic ferrite compounds having the formula $M'_xM''_{1-x}Fe_2O_4$, wherein M' and M'' are different and are independently selected from Co, Ni, Zn, Ba, Sr, Mg, Mn and $0 \leq x \leq 1$. In some such embodiments, $0.1 \leq x \leq 0.9$. Other soft magnetic materials include Fe—Si alloy, Ni—Fe alloy, and nanocrystalline alloy of Fe, Ni and/or Co with B, C, P, or Si.

Magnetic nanoparticles having a variety of different sizes and shapes may be used. Thus, the term "nanoparticles" is not meant to be limiting to a particular size. However, in embodiments, the nanoparticles may have each of their three dimensions on the order of 1000 nm or less. The nanoparticles may be spherical, but this term encompasses irregularly shaped particles which are still reasonably well defined three dimensions which are of similar magnitude. The nanoparticles may be characterized by an average diameter. The average diameter may be 500 nm or less, 200 nm or less, 100 nm or less, 50 nm or less, 25 nm or less, 10 nm or less, 5 nm, or in the range of from 1 nm to 100 nm, from 1 nm to 25 nm, or from 1 nm to 10 nm. In other embodiments, the average diameter may be in a range of from 1 nm to 200 nm, or from 10 nm to 200 nm. Magnetic nanoparticles having an average diameter of 10 nm or less are useful as they exhibit superparamagnetic behavior at room temperature (20 to 25° C.).

In embodiments, the magnetic nanoparticles are functionalized, i.e., they comprise a functional group, which may be covalently bound to a surface of the magnetic nanoparticles. For example, the magnetic nanoparticles may be functionalized with chemical groups, such as a carboxylate, an amine, a phosphate, a pyridine, a sulfate; or biological groups such as amino acids, organic molecules, and antibodies. These groups can be either chemically (covalently) or physically (noncovalently) bonded to the magnetic nanoparticles. In embodiments, the magnetic nanoparticles are unfunctionalized.

Combinations of different types of magnetic nanoparticles may be used, e.g., magnetic nanoparticles having different compositions, different sizes, and/or different functionalization states.

A variety of methods may be used to form the magnetic nanoparticles. By way of illustration, the Example, below, discloses a suitable method of making iron oxide magnetic nanoparticles. In this method, an oxidizing agent (e.g., a base such as NaOH) is added to an aqueous solution of iron salts for a period to time to induce nucleation and growth of iron oxide magnetic nanoparticles. Other methods may be used.

A variety of porous substrates may be used to form the magnetic nanoparticle coated porous materials. The porous substrate may be composed of natural or synthetic materials; be woven or non-woven; and may assume a variety of forms (e.g., approximately two-dimensional forms such as membranes, sheets, strips, etc. or approximately three-dimensional forms such as pads, balls, blocks, etc.) The overall size and shape of the porous substrate not particularly limited, but depends upon the application. The porous substrates (and thus the coated porous materials) may be referred to as sponges, foams, filters, etc.

The porous substrates may be described as a solid matrix, the surfaces of which define a plurality of pores distributed throughout. In embodiments, the solid matrix may be characterized as being in the form of network of interconnected strands which extend (e.g., randomly, although regularly oriented strands such as those in woven textiles may be used) to define the plurality of pores and elongated, tortuous channels distributed throughout the solid matrix. As noted above, the surfaces of the solid matrix are coated with the magnetic nanoparticles, which generally do not penetrate into the solid matrix itself. These surfaces include outer/external surfaces generally facing away from the body of the solid matrix as well as inner/internal surfaces generally facing towards the interior body. However, as stated, the magnetic nanoparticles generally do not penetrate into the solid matrix, a feature which may be confirmed using various imaging techniques. (See FIG. 6A.)

Figure 9:
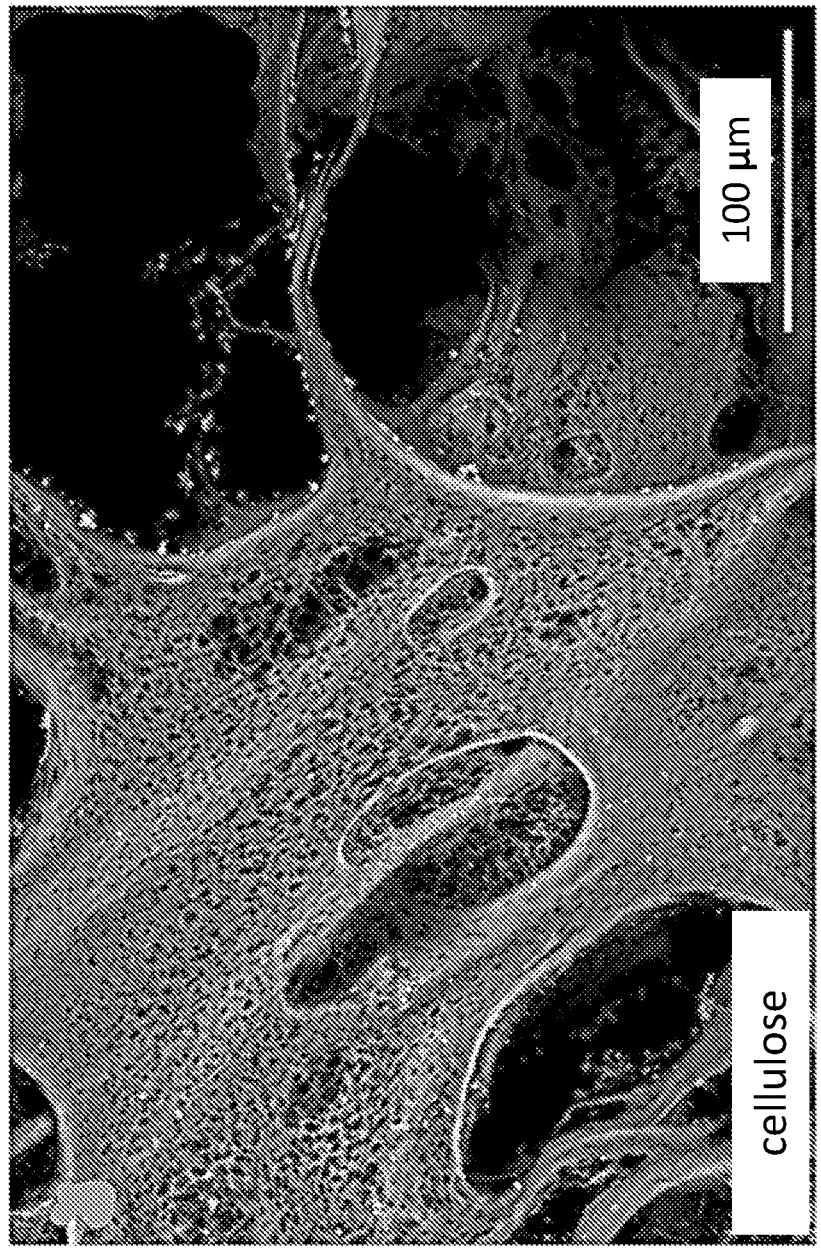
FIG. 9 shows an image of cellulose as a porous substrate. Structural hierarchy is provided by having multiple sets of pores, each set having a different average pore dimension.

The size and shape of the pores may be selected depending upon the application. However, in embodiments, the porous substrates are hierarchical in nature. (See FIG. 9.) This means that the solid matrix defines multiple sets of pores (e.g., 2, 3, etc.), each set characterized by a different average size. The phrase "average size" may refer to an average dimension (i.e., width or diameter) taken as the largest distance across opposing surfaces of the solid matrix defining the pores. For example, a set of pores may be characterized as having an average dimension on the millimeter scale, e.g., in a range of from 1 mm to 10 mm. A set of pores may be characterized as having an average dimension on the micrometer scale, e.g., in a range of from 1 μm to 1000 μm. A set of pores may be characterized as having an average diameter on the nanometer scale, e.g., in a range of from 1 nm to 1 μm. In embodiments, the solid matrix may include two or more such sets, e.g., all three.

The solid matrix may be composed of a variety of natural or synthetic materials (including combinations thereof). Illustrative materials for the solid matrix include polyurethane, cellulose, melamine, polyimide, acrylic, polyamide, polyester, polycarbonate, and polyaramide. Embodiments of these materials have an advantage of being polymeric, flexible, and compressible. Hydrophilic materials are particularly useful, e.g., cellulose, melamine, and polyamide. However, in embodiments, hydrophilic materials may be combined with amphiphilic materials such as polyimide, polycarbonate, and polyurethane or combined with hydrophobic materials such as polyester, polyaramide, and acrylic. In embodiments, the following materials are excluded: activated carbon, biochar, halloysite, silicate, calcium-silicate. Materials such as activated carbon and biochar are generally hydrophobic.

As noted above, the porous substrates are coated with any of the magnetic nanoparticles described above to form the magnetic nanoparticle coated porous materials. Various loadings of the magnetic nanoparticles onto the solid matrix of the porous substrate may be used. In embodiments, the loading may be the range of from 0.2 weight % to 25 weight %. Here, "weight %" is (weight of the magnetic nanoparticles)/(total weight of the coated porous material)*100. This includes from 0.5 weight % to 20 weight %, from 1 weight % to 25 weight %, from 1 weight % to 15 weight %, and from 5 weight % to 10 weight %. The loading may be tuned depending upon the application. The loading may also be tuned to provide a certain surface coverage of the magnetic nanoparticles on the surfaces of the solid matrix. For example, the schematic of FIG. 1 depicts a continuous coating of magnetic nanoparticles on the strands of the solid matrix of the porous substrate with 100% of the surface covered. However, this is not necessary, lower surface coverages may be used in which the magnetic nanoparticles are dispersed (e.g., uniformly) across the surfaces of the solid matrix, with some portions of the surface being bare. In embodiments, the loading of the magnetic nanoparticles is that which allows for the formation of a coating on all surfaces (i.e., inner and outer surfaces) of the solid matrix with a surface coverage of at least 90%, at least 95%, at least 99%, or 100%.

The coating may be characterized by an average thickness as measured in a direction normal to the surface of the solid material. By "average" it is meant an average value as measured from a representative number of locations on the coated porous substrate. In embodiments, the average thickness corresponds to the average diameter of the magnetic nanoparticles in the coating. That is, the coating has a thickness consistent with that of a single nanoparticle.

Other materials may be combined with the magnetic nanoparticles to provide a coating with additional properties. By way of illustration, graphite may be included. As another example, alumina (or another metal oxide) or hydroxyapatite may be included, which is useful for recovering nitrates. However, in embodiments, no other materials or additives are included and the porous substrate consists of the material of the solid matrix and the coating of magnetic nanoparticles.

The magnetic nanoparticles in the coating imparts magnetic properties to the present coated porous materials. Confirmation of the magnetic nature may be obtained by assessing the response of the magnetic nanoparticle coated porous material to a magnet, e.g., a permanent magnet ($B_r$=200-2000 mT). An electromagnet may also be used. Confirmation of the magnetic nature may be carried out by exposing a magnetic nanoparticle coated porous material to a magnetic field as low as 200 mT and confirming that the magnetic field induces motion of the coated porous material.

Methods of making the magnetic nanoparticle coated porous materials are also provided. In embodiments, such a method comprises immersing any of the disclosed porous substrates in a formulation (e.g., a slurry) comprising any of the disclosed magnetic nanoparticles for a period of time to form a coating of the magnetic nanoparticles on surfaces of the solid matrix of the porous substrate. Immersion may be accompanied by mixing the formulation, including by sonication or vortexing. Immersion may be carried out at room temperature (20 to 25° C.). The coated solid matrix may then be heated at an elevated temperature (i.e., greater than room temperature) for a period of time to provide the magnetic nanoparticle coated porous material. Illustrative conditions and additional details are provided in the Example below. Notably, the methods do not require that the porous substrate be pre-treated, e.g., pre-treated with an acid. Using cellulose as an example, acid pre-treatment leads to carboxylation of cellulose, i.e., the cellulose is functionalized with carboxylate groups. This, in turn, may lead to covalent bonds being formed between the carboxylated cellulose and the magnetic nanoparticles. In embodiments, the porous substrate is unfunctionalized. In embodiments, the porous substrate does not comprise carboxylate groups. In embodiments, the magnetic nanoparticles are not covalently bound to the porous substrate.

The magnetic nanoparticle coated porous materials may be used in a variety of applications. One such application is recovering contaminants such as metals (e.g., chromium, copper, cadmium, nickel), metalloids (e.g., arsenic), heavy metals (e.g., lead, mercury), and inorganic compounds (e.g., phosphates, nitrates) from contaminated water. However, in embodiments, the application involves recovering only phosphates, rather than another contaminant, such as arsenic. The phrase "contaminated water" refers to solutions and mixtures comprising water, i.e., other components may be present along with the water. In addition, the phrase encompasses water, and solutions and mixtures thereof which may be suspected of being contaminated. The source of the contaminated water is not particularly limited. For example, the source may be wastewater from a facility, run-off from an industrial, household, or commercial site, or a body of water such as a pool, a pond, lake, ocean, creek, stream, river, etc.

In embodiments, the contaminant recovery method comprises contacting any of the magnetic nanoparticle coated porous materials with the contaminated water for a period of time to adsorb the contaminant from the water. Adsorption of the contaminant by the magnetic nanoparticle coated porous material results in a contaminant-containing magnetic nanoparticle coated porous material and reduces the content of the contaminant in the water. As further described below, "reducing" can include reducing the content of the contaminant in the water to zero (or so close to zero that any small amount of the contaminant remaining does not materially affect the properties of the water).

The type of contact of the magnetic nanoparticle coated porous material with the contaminated water is not particularly limited. By way of illustration, if the coated porous material is in the form of a planar membrane or a column packed with the coated porous material (e.g., in bead form), the contact may be carried out by passing the contaminated water through the membrane or column. If the coated porous material is in the form of a sheet or pad (e.g., wipe, mop head, sponge, etc.), the contact may be carried out by placing the coated porous material on the contaminated water. Other types of contact include immersing (partially or completely) the coated porous material into the contaminated water.

The type of contact and the period of time of contact may be adjusted to optimize (e.g., maximize) the absorption/recovery of the contaminant by the magnetic nanoparticle coated porous material. These parameters may be adjusted so that the coated porous material adsorbs/recovers at least 80%, at least 85%, at least 90%, at least 95%, at least 98% or 100% of the contaminant from the contaminated water. (See also, FIGS. 2 and 7A-7B.) In addition, depending upon the type of magnetic nanoparticle coated porous material and/or the type of application, the contacting may be carried out under conditions selected to facilitate adsorption (e.g., maximize) of the contaminant. By way of illustration, if adsorption is sensitive to pH, this condition may be adjusted to facilitate adsorption of the contaminant. This is illustrated in the Examples below in which acidic pH facilitates adsorption of phosphate by $Fe_3O_4$ coated cellulose membranes.

After the contacting step, the adsorbed contaminant may be released from the magnetic nanoparticle coated porous material. A variety of release techniques may be used. One such release technique leverages sensitivity of the adsorption to conditions such as pH. By way of illustration, although acidic pH facilitates adsorption of phosphate by $Fe_3O_4$ coated cellulose membranes, basic pH induces desorption of the phosphate due to competition with hydroxide adsorption. (See also, FIGS. 3 and 7D) Thus, release may be induced by increasing the pH of the contaminant-containing coated porous material, which may be accomplished by contacting the contaminant-containing coated porous material with water having a basic pH. Thus, more generally, this type of release technique involves exposing the contaminant-containing coated porous material to the condition which induces desorption/release of the contaminant.

Another illustrative release technique leverages the magnetic nanoparticles present in the coating. Such a technique comprises exposing the contaminant-containing magnetic nanoparticle porous material to a radio-frequency (RF) field for a period of time. The RF field thermally activates the magnetic nanoparticles of the coating to generate heat, which may induce desorption/release of the contaminant. The RF field strength, frequency, and time may be adjusted to optimize (e.g., maximize) release of the contaminant.

Other release techniques include mechanical perturbation, heat, or dilution in a medium free from the contaminant.

Regardless of the release technique, the contaminant recovery method may further comprise collecting the released contaminant. This is particularly useful for contaminants such as phosphates which may be reused for other purposes, e.g., to make phosphate fertilizers.

The contaminant recovery method may further comprise repeating the contact, release, and/or collection steps one or more additional times, thereby highlighting another advantage of the magnetic nanoparticle coated porous materials—reusability. In fact, the Example below demonstrates that cellulose sponges coated with $Fe_3O_4$ nanoparticles may be reused many times to recover phosphate from aqueous solutions with little change in their adsorption capabilities. (See also, FIGS. 4 and 7E.)

EXAMPLES

Example 1

Materials & Methods

Materials: Cellulose membranes were purchased from Fisher Scientific (Essendant Medium Cellulose Sponge). NaOH, $FeCl_2.4H_2O$, $FeCl_3.6H_2O$ for nanoparticle synthesis were ordered from Sigma Aldrich and Fisher Scientific. $KH_2PO_4$ (from Sigma Aldrich) was used to make ortho phosphate solutions. HCl (EMD/Fisher Scientific) and NaOH (Sigma Aldrich) were used to adjust the final pH.

Slurry Synthesis: Iron oxide nanoparticles were formed by mixing $FeCl_2.4H_2O$ and $FeCl_3.6H_2O$ in a 1:2 molar ratio. The powders were dissolved in deionized (DI) water using a magnetic stir bar. An excess of 1.0M NaOH (approximately 10:1 molar ratio $NaOH:FeCl_2.4H_2O$) was added to form the iron oxide nanoparticles. Nanoparticles were washed twice with DI water using a magnet to separate the particles from the solution. Once cleaned, the nanoparticles were diluted in DI water to the appropriate concentration.

Membrane Synthesis: Cellulose membranes were cut to size (~200 mg) and then washed in DI water. The nanoparticles were re-dispersed in the slurry (230 mg of nanoparticles/20 mL of solution) by vortexing the solution. The cleaned cellulose membrane was added to the solution, vortexed, quickly removed, and placed on a petri dish. The membrane was then dried in an oven at 60° C. Two coatings were applied. Finally, the coated membranes were washed in DI water and dried again.

Phosphate Removal Tests with Membrane: Membranes coated in approximately 20 mg of nanoparticles were each added to 5 mL of DI water in a 15 mL falcon tube. 5 mL of phosphate solutions of various concentrations was then added to the same tubes creating a total of 10 mL of test solution. Experiments were conducted at pH 4. Tubes were turned on their side and placed on an orbital rotating plate moving at 110 rpm for 30 minutes, creating a sloshing motion to improve circulation of solution. After testing, the membranes were removed from the solution without squeezing. Experiments were completed in duplicate. Analogous tubes without the membranes were made as controls to quantify the percent removal.

Phosphate Tests with Nanoparticles: 5 mL of nanoparticle slurry was added to falcon tubes. The concentration of the slurry was calibrated so that the number of nanoparticles in 5 mL matched the number of nanoparticles coated on a membrane. 5 mL of phosphate solutions of various concentrations was then added to the same tubes creating a total of 10 mL of test solution. Tubes were turned on their side and placed on an orbital rotating plate moving at 110 rpm for 30 minutes. After testing the nanoparticles were separated from the solution using a magnet or centrifuge. The supernatant was immediately removed to stop adsorption. Experiments were completed in duplicate. Analogous tubes without the particles were made as controls to quantify the percent removal.

Cycling Test: Membranes coated in approximately 10 mg of nanoparticles were added to 15 mL falcon tubes containing 10 mL of pH 4, 5 mg of P/L solution. The term "P/L" refers to milligrams of phosphorus per liter of water. Because phosphate can take many forms depending on the water conditions, the phosphate concentration is normalized to the number of phosphorus atoms. Tubes were turned on their side and placed on an orbital rotating plate moving at 110 rpm for 30 minutes. After testing the membranes were removed from the solution without squeezing and placed in different 50 mL falcon tubes containing 30 mL of 1.0M NaOH. Tubes were turned on their side and placed on an orbital rotating plate moving at 110 rpm for 10 minutes. After NaOH treatment, membranes were squeezed with tweezers to remove any excess basic solution and then placed in new falcon tubes with 10 mL of fresh 5 mg of P/L solution. The pH was adjusted to approximately 4. Experiments were completed in duplicate. Excess untreated test solution was used to quantify the percent removal.

Acid/Base Test: Membranes coated in approximately 20 mg of nanoparticles were added to 50 mL falcon tubes containing 20 mL of solution with approximately 5 mg of P/L at various pHs. Tubes were turned on their side and placed on an orbital rotating plate moving at 110 rpm. After testing the membranes were removed from the solution without squeezing. Experiments were completed in duplicate. Excess untreated test solution at each pH was used to quantify the percent removal.

Phosphate Quantification: Samples were digested by adding 3% nitric acid and leaving in a 65° C. water bath for at least 2 hours. Phosphorus concentration was measured using a Thermo iCap 7600 ICP-OES in axial mode with wavelength 178 nm. Each sample was measured with 3 repeats. Standards were made using an Inorganic Ventures 1 mg/L Phosphorus standard.

Results & Discussion

As received, the cellulose membranes are yellow in color. After coating, the resulting membranes are black in color and responsive to a permanent magnet (image not shown).

Figure 2:
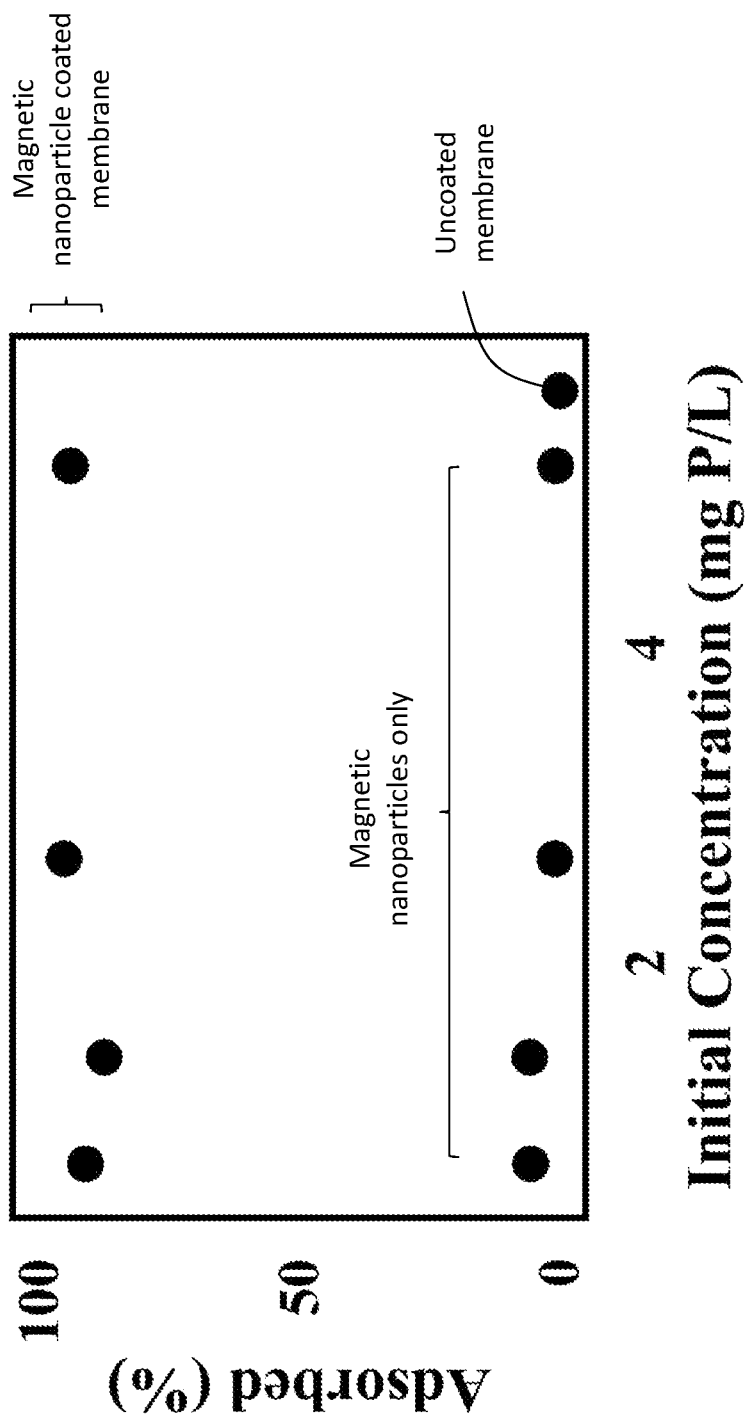
FIG. 2 compares the phosphate absorbance of an illustrative magnetic nanoparticle coated porous material to the magnetic nanoparticles only and to the uncoated porous material.

As shown in FIG. 2, the nanoparticles alone adsorb much less than the nanoparticle-membrane composite. The results of FIG. 2 also show that the uncoated membrane does not adsorb phosphates. The data suggests that the enhanced absorptivity of the composite material is due to the improved exposure of the nanoparticles via the large surface area of the membrane. The porous membrane composite is the core concept of the present disclosure leading to the facile use of the nanoparticles and exceptional phosphate recovery (nearly 100%).

Figure 3:
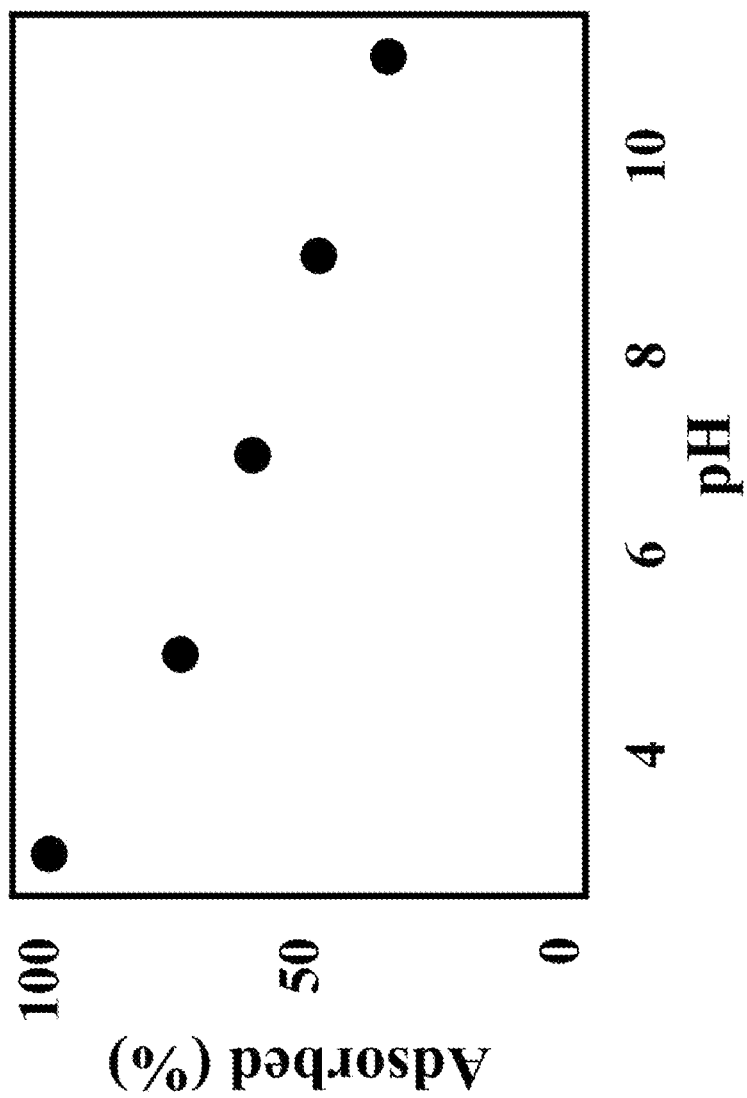
FIG. 3 shows the pH dependence of phosphate adsorption by the magnetic nanoparticles of the coated porous material.
Figure 4:
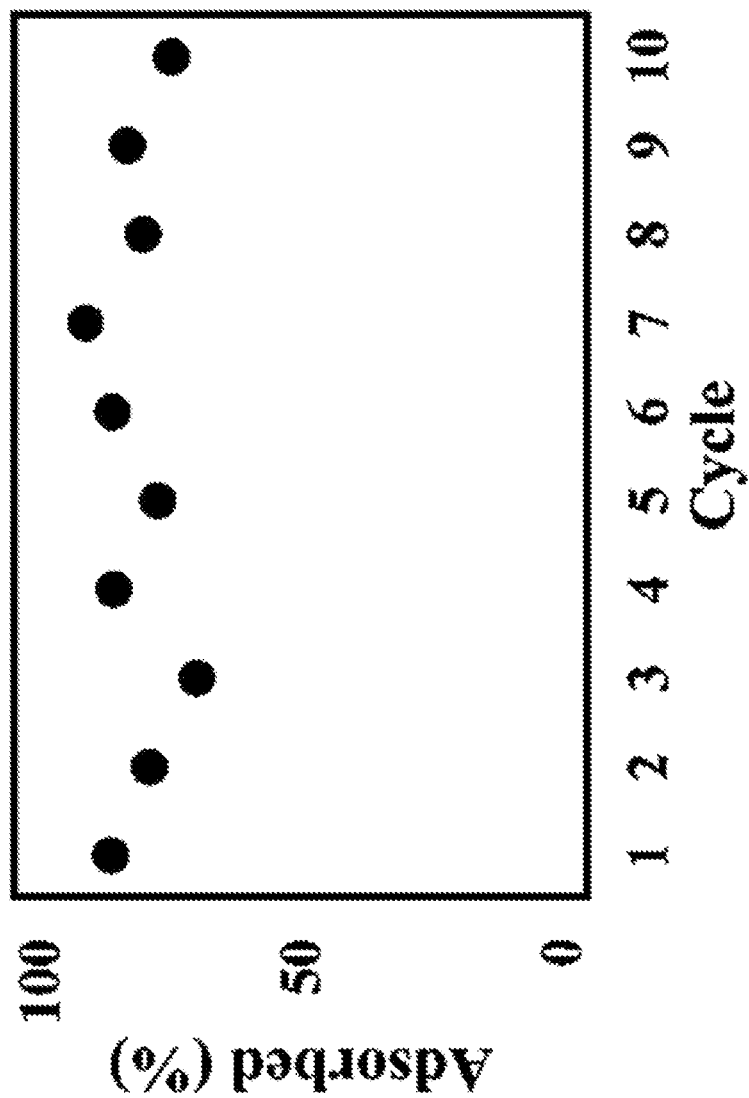
FIG. 4 shows that the magnetic nanoparticle coated porous material may be reused for multiple cycles to achieve high levels of phosphate adsorption.
Figure 5:
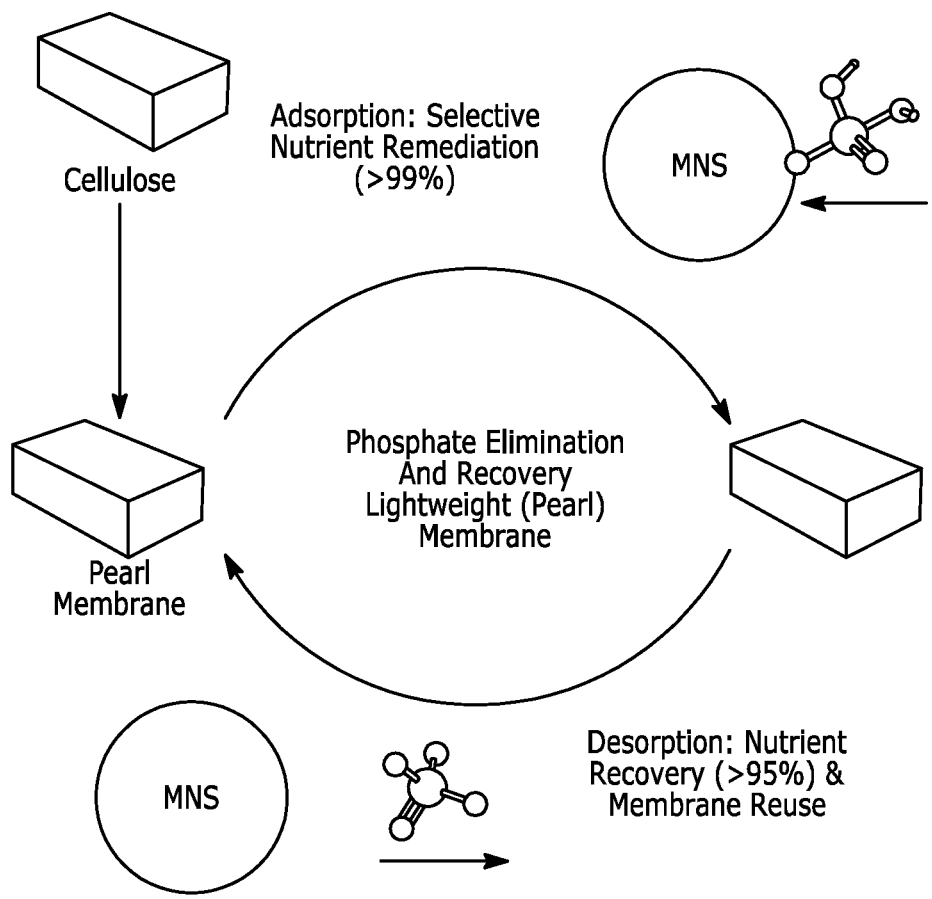
FIG. 5 shows the PEARL membrane is made by coating cellulose with multifunctional nanostructures (MNS) using a scalable, water-based process. The nanomaterials are tailored for selective phosphate binding. Using mild conditions, the phosphates can be adsorbed and desorbed, allowing for reuse of the PEARL membrane and recovery of analytes.

As shown in FIG. 3, phosphate adsorption by nanoparticles is strongly pH dependent because of the competition between $H_2PO_4^-$ and OH. This pH dependence leads to facile desorption of phosphates by placing the membrane in a basic solution. As shown in FIG. 4, the nanoparticle coated membrane can be used to adsorb phosphates for multiple cycles. The error bars in FIG. 4 may be minimized by optimizing the pH adjustment (back to 4) after NaOH treatment.

There were no visible signs of membrane deterioration after the cycling test, demonstrating the robustness of the coated membrane.

Example 2

Experimental

PEARL Membrane Synthesis

Iron precursors and NaOH were bought from Sigma-Aldrich and used as received. Iron oxide ($Fe_3O_4$) nanoparticles were prepared using a batch co-precipitation method. $FeCl_2$ and $FeCl_3$ were dissolved in deionized (DI) water with a 1:2 ratio. Excess NaOH was separately dissolved in DI water and subsequently added to the iron solution. Nanoparticles were washed thoroughly with magnetic separation followed by decanting until the pH of the slurry was stable.

Cellulose sponges were acquired from Thermo Fischer Scientific. Sponges were cut to size with a razor blade. After thorough washing with DI water, they were dip coated with an aqueous slurry of nanoparticles and then dried at 60° C. in a box furnace. The membrane was washed in DI water until the coating was stable and then returned to the box furnace for drying. The PEARL membrane was allowed to cool to ambient temperature.

Adsorption Studies

Phosphate samples were made by dissolving potassium phosphate monobasic (Sigma-Aldrich) in DI water. Sorption was tested in 30 mL batch processes using falcon tubes. Adsorbents were added to the falcon tubes and placed on an orbital shaker for test duration. Orion Star A111 Benchtop pH Meter (Thermo Fisher Scientific) was used for pH determination calibrated with buffers at pH 4, 7 and 10 (Thermo Fisher Scientific). Adjusting of pH was done with HCl (36.5-38.0% Thermo Fisher Scientific) and NaOH (Sigma-Aldrich) solutions.

Samples from Terrence J. O'Brien WRP in Skokie, Ill., USA were tested after secondary treatment. These complex aqueous samples have a number of dissolved ions that compete against phosphate for binding.

Phosphate Concentration Determination

Quantification of P was accomplished using ICP-OES of acid digested samples. Samples were digested in concentrated trace nitric acid (>69%, Thermo Fisher Scientific) and placed at 60° C. for at least 30 minutes. Ultra-pure $H_2O$ (18.2 MΩ·cm) was added to produce a final solution of 3.0% nitric acid (v/v) in a total sample volume of 10 mL. Quantitative standards ranging from 160 to 0.05 ug/g P were made using a 1000 ug/mL P standard (Inorganic Ventures) in 3% nitric acid (v/v). Table 1 lists the concentrations used for each experiment.

TABLE 1

| Experiment | Quantification Method | ICP standards (ppm of P) |
|---|---|---|
| FIG. 3A | ICP-OES | 20, 10, 5, 2.5, 1.25, 0.63, 0.31, 0.16, 0.08 |
| FIG. 3B | ICP-OES | 20, 10, 4, 2, 1, 0.25 |
| FIG. 3C | ICP-OES | 20, 10, 5, 2.5, 1.25, 0.63, 0.31, 0.16, 0.08 |
| FIG. 3D | IC | N/A |
| FIG. 3E | ICP-OES | 160, 40, 20, 10, 2, 1, 0.5, 0.1 |
| FIG. 3F | ICP-OES | 20, 10, 5, 2.5, 1.25, 0.63, 0.31, 0.16, 0.08 |
| FIG. 3G | ICP-OES | 160, 40, 20, 10, 5, 2.5, 2, 1.25, 1, 0.63, 0.5, 0.31, 0.16, 0.1, 0.08 |
| FIG. 3H | IC | N/A |

ICP-OES was performed on a computer-controlled (QTEGRA software) Thermo iCap7600 ICP-OES (Thermo Fisher Scientific) operating in axial view and equipped with a CETAC 520 autosampler (Omaha, NE, USA). Each sample was acquired using 5 second visible exposure time and 15 second UV exposure time, running 3 replicates. The spectral line selected for analysis was P=177.495 nm.

Ion chromatography was performed using a Thermo Scientific Dionex ICS-5000+ equipped with a Dionex AS-DV autosampler and using a Dionex IonPac AS22 column (Product No 064141, Thermo Scientific). The analysis was run using an eluent of 4.5 mM Sodium Carbonate and 1.4 mM Sodium Bicarbonate (Product No 063965 from Thermo Scientific) and a Dionex AERS 500 Carbonate 4 mm Electrolytically Regenerated Suppressor (Product No 085029 from Thermo Scientific). A mixed elemental standard containing 1000 ug/mL each of $F^-$, $Cl^-$, $Br^-$, $NO^{2-}$, $NO^{3-}$, $PO_4^{3-}$ and $SO_4^{2-}$ (IV-STOCK-59 from Inorganic Ventures) was used to make quantitative standards consisting of 25, 5, 1, 0.5, 0.1, and 0.5 ug/mL of each anion in ultra-pure $H_2O$.

Recovery data was collected with ion chromatography instead of ICP-OES. When more basic conditions were used, the IC data showed nonstandard peaks and significant drifting of expected peaks, suggesting breakdown of the PEARL membrane and phosphates. This information is not accessible in a typical ICP-OES measurement. Results were qualitatively confirmed with the ascorbic acid method as recommended by the EPA. (Sousa, A. A. et al., *Ultramicroscopy* 123, 38-49 (2012).)

Electron Microscopy

Cross sectional samples for SEM and STEM were prepared by embedding membranes in resin and cutting with the Leica UC7/FC7 Cryo-Ultramicrotome. Nanostructures were prepared for TEM analysis by drop casting on a lacey carbon grid.

Images were collected with the Concentric Backscattered Detector on the SEM FEI Quanta 650 operated at 20 kV in low vacuum mode to minimize charging artifacts. SEM images of the sectioned samples were acquired with the Retractable Backscattered Electron Detector on the JEOL 7900FLV operated at 5 kV in low-vacuum mode. The image was taken in backscatter mode in order to emphasize the compositional contrast of the material.

STEM images of the sectioned samples were acquired using Hitachi HD-2300 operated at 200 kV. Energy-dispersive X-ray spectroscopy (EDS) was collected using a dual detector system. The results were summed across 120 frames.

TEM imaging of the nanoparticles was performed at 300 kV with the JEOL ARM300F GrandARM. STEM imaging of the nanoparticles was acquired on the JEOL ARM200CF Aberration-Corrected TEM operated at 200 kV. EELS data was taken in Dual EELS acquisition mode with a Gatan GIF Quantum ER mounted on a JEOL ARM200CF. The instrument was operated at 200 kV in STEM mode with a camera length of 20 cm. The convergence angle of the probe was 6.9 mrad and spectrometer was operated with a dispersion of 0.1 eV/channel.

EELS spectra were aligned to the zero-loss peak and background of edges was subtracted using a power law fit algorithm. The average low loss spectrum estimates the average sample thickness as 76 nm. The phosphate ions are strongly susceptible to beam damage, thus a noisy data set was acquired, and nearest neighbor averaging was used to boost signal to noise for spatial mapping. To keep dispersion low, iron was quantified using its strong M peak. It is well known that phosphorus is a difficult element to quantify due to the overlap in its L23 signal (132 eV) with the plasmon edge. Nonetheless the L edge was chosen for its superior signal to noise over other phosphorus edges, and its shape could be revealed with proper background subtraction.

Surface Area Determination $N_2$ adsorption and desorption isotherms were obtained at 77K by a 3Flex analyzer (Micromeritics). Pore characteristics were calculated using a cylindrical porous oxide surface area DFT model for monolayer adsorption. Surface area was determined using the Brunauer-Emmett-Teller (BET) method.

Thermogravimetric Analysis

Thermogravimetric analysis (TGA) was conducted using a Mettler Toledo combined TGA/DSC 3+ to confirm nanoparticle mass loading and to observe the effects of the nanoparticle coating on the thermal properties of the sponge. TGA experiments used a temperature profile from room temperature to 800° C. The temperature was held at 40° C. for 3 minutes, then increased to 150° C. at 10°/minute to capture the loss of water weight, and subsequently increased to 800° C. at 20°/minute, capturing the total combustion of the sponge, allowing for determination of the mass of the iron oxide coating. A similar process was employed using a conventional furnace and bulk sponges. Tests were performed on typical PEARL membranes of various sizes.

X-Ray Photoelectron Spectroscopy (XPS)

X-ray photoelectron spectroscopy was conducted using a Thermo Scientific ESCALAB 250Xi system with charge referenced to adventitious C1s, C—C peak at 284.8 eV. Samples were prepared for analysis by vacuum drying to avoid any change in oxidation state that can occur with heating.

X-Ray Powder Diffraction (XRD)

X-ray diffraction measurements were taken on powder samples using Rigaku SmartLab with Cu-Kα radiation ($\lambda$=1.5418 Å).

Surface Charge

A Malvern Zetasizer Nano ZS90 with a 633 nm laser was used to conduct the zeta potential measurements. Measurements were performed in a clear disposable cuvette at room temperature.

Results and Discussion

The Architecture of the PEARL Membrane

The platform membrane consists of two key components: a membrane and a nanoparticle coating, each of which can be tuned to the specific water remediation challenge. Cellulose was chosen as the platform for the PEARL membrane because of its hydrophilic character, large surface area to volume ratio, and hierarchical structure. These features enable it to facilitate large flow rates and necessary nanoparticle-dissolved pollutant interactions. It is also widely commercially available, biocompatible, and affordable.

Iron oxide nanoparticles were selected for the magnetic nanoparticles. This novel architecture, where the nanostructures are anchored on the cellulose, turns this promising nanostructure into a realizable solution.

A scalable, water based (environmentally friendly) process was deliberately used over chemically intensive processes that might have more fine control over the material coating. This naturally introduces questions about the efficiency of the membrane and its structure.

This and other such questions were addressed through nanocomposite characterization. There are significant intrinsic challenges in characterizing such a membrane due to its porous, hierarchical structure and its hybrid composition of soft (cellulose) and hard (iron oxide) structures. Nevertheless, using a correlative microscopy approach, the structure of the PEARL membrane was described at multiple length scales to help understand its remediation behavior.

Figure 6A:
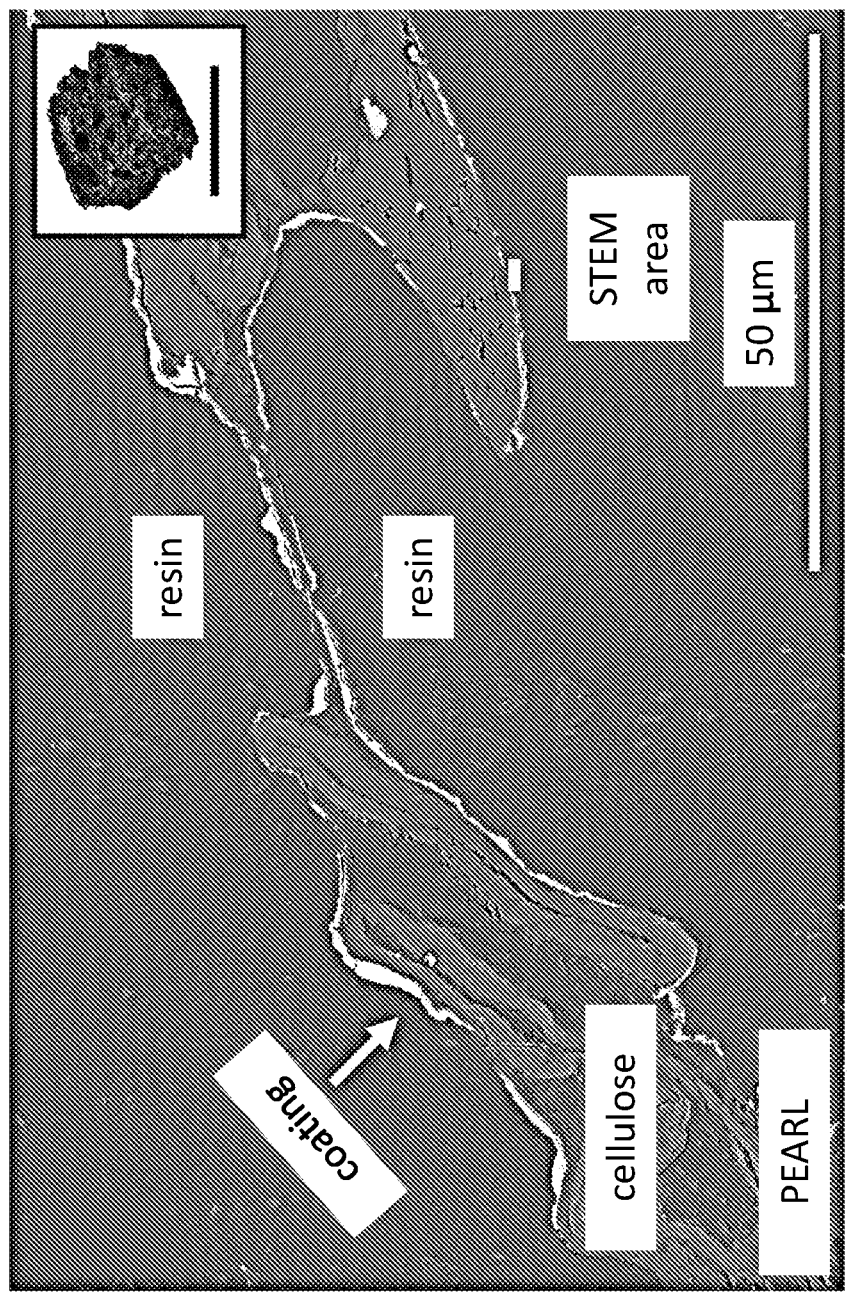
FIG. 6A shows a SEM image of cross section of the PEARL membrane which reveals the nature of the coating. Inset shows PEARL membrane.

Images confirmed that the cellulose exhibited a hierarchical structure with pores at multiple length scales, including at the macro scale. The coating is made of magnetite nanoparticles, whose $Fe_3O_4$ chemical composition was confirmed by powder x-ray diffraction. The inset in FIG. 6A shows the PEARL membrane, which seemingly retained the structure of the cellulose while anchoring the nanostructures.

To better understand the properties of the coating, an ultramicrotome was employed to prepare cross sections of the sample. The PEARL membrane (FIG. 6A) showed expected features: coating, resin, and cellulose. The iron oxide nanoparticle coating was not completely uniform, but it was possible to see that it was covering most outer surfaces. The cellulose sponge without a coating imaged in the same mode showed that the coating process modified only the surface of the membrane. Because the molecular scale interactions of the membrane happened at its solid-fluid interface, these SEM images suggest that the nanocoating was successfully applied, as the functional component was present across the entire surface, without intercalating within the membrane.

A multimodal approach was employed to investigate more closely regions with low levels of coating. Bright field images showed the nanoparticles on the sponge were approximately 10 nm in diameter. Dark field images suggested that the coating was made of heavy elements. The energy-dispersive X-ray spectroscopy (EDS) map confirms as expected that the coating was composed of iron. In some regions the coating was incredibly thin, even on the order of a single nanoparticle.

From the electron microscopy analysis, it was observed that there was some degree of agglomeration, which is expected from a scalable coating method that avoids complex processes and toxic chemicals. Nonetheless, areas that appeared dim in other images may in fact have had an ultra-thin coating contributing to the functional performance of the PEARL membrane.

Thermogravimetric and surface area analysis can provide correlative estimates of nanoparticle loading. The TGA curve of a typical PEARL membrane is shown in FIG. 6B, where the remaining mass indicates the nanoparticle loading, information which was used in determining adsorption in FIGS. 7A-7H. In the studies of various shapes and sizes of the PEARL membrane, the coating consistently represents 5-10% of the structure mass, underscoring that only a very small degree of coating is needed to transform cellulose into an effective remediation tool.

Figure 6C:
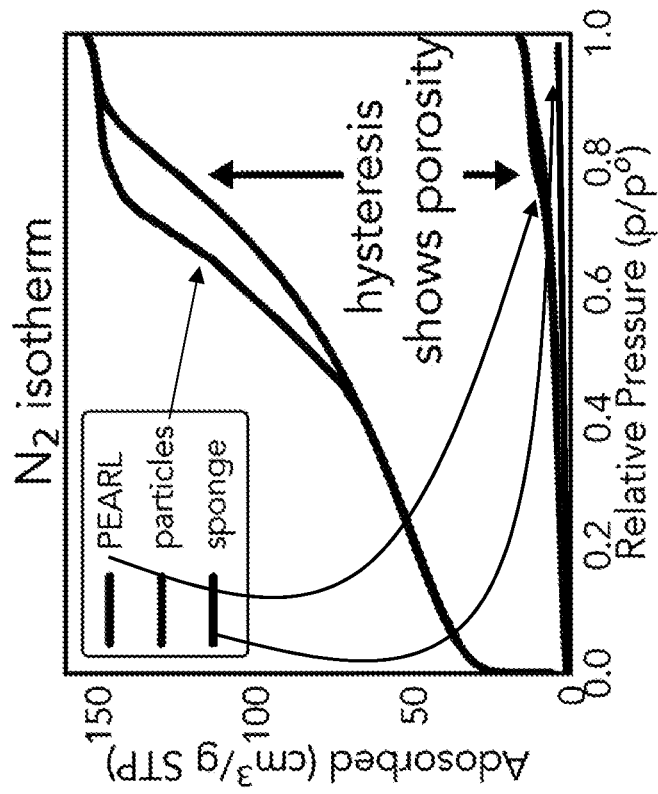
FIG. 6C shows that $N_2$ adsorption isotherm reveals surface area and porosity profile of PEARL membrane, cellulose, and nanoparticles. Inset scale bar in FIG. 6A is 2 cm.
Figure 6B:
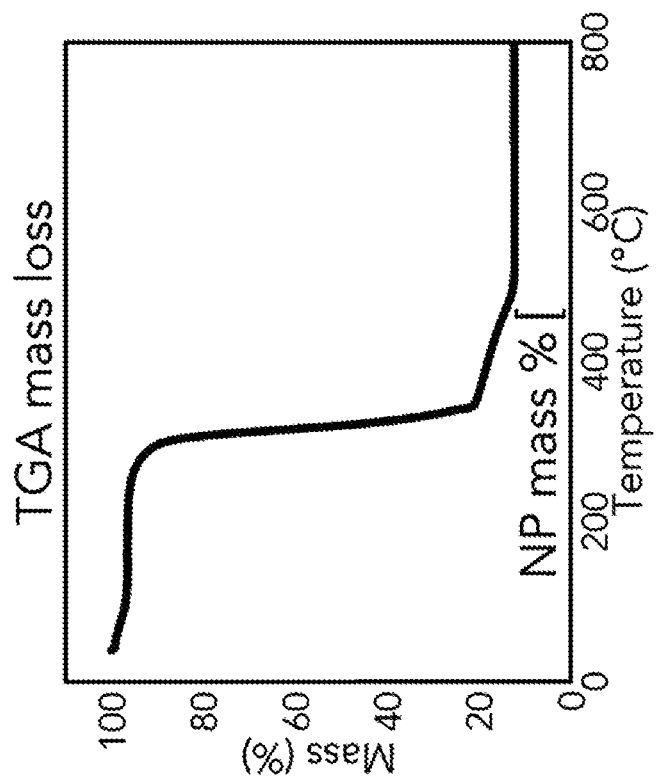
FIG. 6B shows that TGA quantifies the mass loading of nanoparticles on PEARL membrane.

The linear isotherms displayed in FIG. 6C reveal the surface area of the nanoparticles alone, cellulose alone, and the nanocomposite structure. The BET surface areas were 179.5, 5.2, and 12.0 $m^2/g$ respectively. After surface area analysis, the same samples were estimated to have a nanoparticle loading of 6.5% with thermogravimetric analysis.

Using a linear combination of the surface areas, it was then expected for the nanocomposite to have a surface area of 16.5 $m^2/g$. This theoretical result is close to the experimental value of 12 $m^2/g$ and suggests only some of the loaded nanoparticles were not accessible to the surface. As also confirmed with electron microscopy, most nanoparticles in the system comprised a thin surface coating that was actively involved in sorption, while a small fraction were inaccessibly buried in clumps beneath the surface. The linear isotherm plot can also be used to show how the membrane takes on the characteristics of the nanostructures. As shown in FIG. 6C, the PEARL membrane and the nanoparticles had similar hysteresis loops, which suggests analogous porosity in the mesoporous (2-50 nm) region. Overall, it was observed that the synthesis process allowed cellulose to take on the characteristics of the tailored nanostructures.

PEARL Membrane Performance: Efficient Phosphate Recovery

Adsorption and desorption studies were performed to understand how the PEARL membrane interacts with phosphates. As shown in FIG. 7A, a comparable dose of multifunctional nanostructures alone or anchored on the cellulose membrane adsorbed 98% of phosphates in a 10 mg of P/L sample. The nanocomposite, however, avoids any additional centrifugation, magnetic separation, or filtration steps, making the PEARL membrane a more efficient, easy-to-use approach. Moreover, this comparison underscores the understanding that the majority of the nanostructures are actively involved in binding when anchored on a membrane.

The sponge itself does not participate in phosphate sequestration, allowing the characterization and performance analysis below to focus on nanostructures alone. Additionally, greater than 99% remediation was observed in FIG. 7B by using multiple, short passes (between 1 and 4 treatment steps).

FIG. 7C shows the pH dependence of adsorption. OH⁻ competed with $PO_4$ at basic conditions, and the surface potential of the iron oxide changed from positive to negative. The pH dependence can be exploited for desorption.

After a PEARL membrane was used for phosphate removal, it was transferred to an aqueous solution of varying pH. As shown in FIG. 7D, when the conditions are basic, the phosphates can be captured for reuse. Here up to 58% of phosphates removed from solution were recovered. As shown in additional experiments, up to 74% of the phosphates can be recovered when the time is extended. Nonetheless, this result suggests a small fraction of the phosphates are irrevocably bonded to the nanoparticles, an observation which correlates well with electronic state studies below.

Figure 7F:
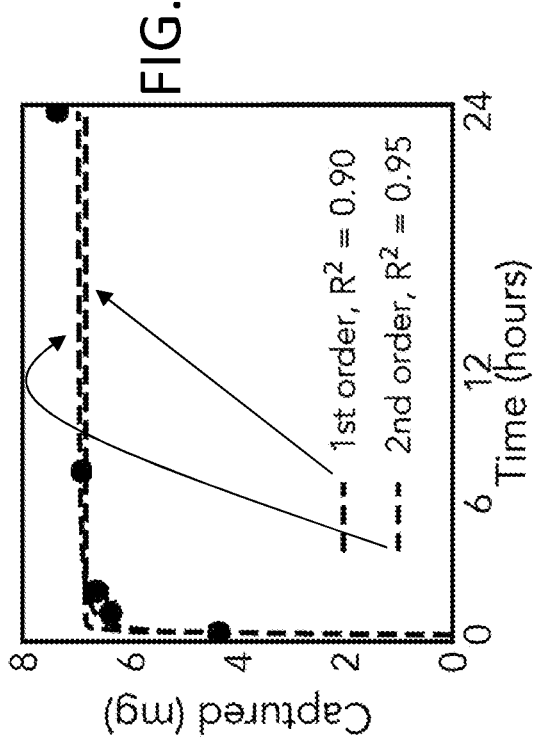
FIG. 7F shows the kinetic study of phosphate adsorption.
Figure 7E:
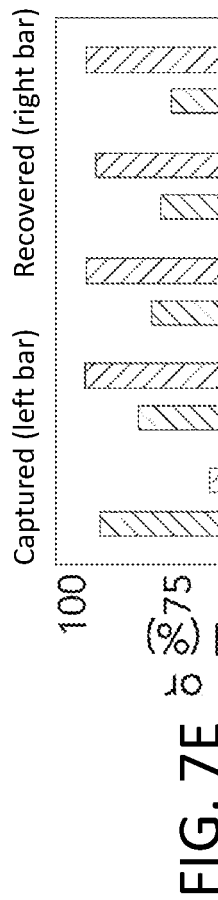
FIG. 7E shows that the PEARL membrane can be used for multiple cycles, and after the first cycle, 95% of phosphates can be recovered.
Figure 7G:
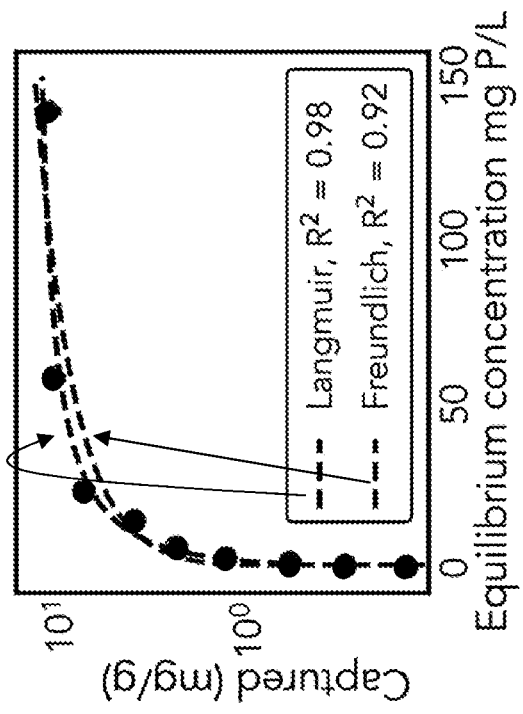
FIG. 7G shows the isotherm study of phosphate adsorption.

Because this technology is pH dependent, it can be reused for multiple cycles. FIG. 7E shows adsorption behavior for the first 5 cycles. In this test, a PEARL membrane was moved between acidic solutions containing approximately 10 mg of P/L to basic solutions. In the first cycle, 93% of phosphates were removed. In subsequent cycles, the performance slightly decreased, which can be attributed to residual basic solution being transferred as the membrane is cycled. 10 cycles were obtained in another experiment, where the pH was adjusted after each transfer; the performance was consistent across cycles.

The recovery results in FIG. 7E show the same behavior as described in FIG. 7D initially. However, after the first cycle, 95% of the phosphates could be recovered. This data suggests after some initial preconditioning of the nanomaterials, the system reaches an equilibrium state in which ions can be more easily removed and recovered. Exceptional performance in nutrient recovery makes this nanocomposite a promising tool for phosphate remediation.

To understand the kinetics of sorption, phosphate adsorption on the membrane was stopped at various stages between 5 minutes and 24 hours. As shown in FIG. 7F, although there was a slight increase in adsorption over a longer time horizon, after the first hour, the majority of the phosphates were removed. Moreover, even within the first 5 minutes many anions were recovered from solution. The short reaction times further highlight the technological relevance of the PEARL membrane.

These data were fit using first and second order models as shown in Equations 1 and 2, where $q_e$ is the amount of phosphate adsorbed, $K_1$ and $K_2$ are rate constants, and t is time.

$$q_t = q_e(1 - e - K_{1t}) \tag{1}$$

$$q_t = K_2 q_e^2 t / (1 + K_2 q_e t) \tag{2}$$

The results in FIG. 7F show better agreement with the second order results. Fit parameters for the first order model were Qe (6.8), K (6.6) ad $R^2$ (0.90). For the second order model the fit parameters were Qe (7.0), K (2.8) ad $R^2$ (0.95). The agreement with the second order model suggests chemisorption contributes to the binding mechanism.

Sorption data can be fit with equilibrium isotherm models for more insight into interaction between nanoparticles and analytes. Langmuir describes a monolayer of non-interacting analytes that adsorb onto active sites. Alternatively, the Freundlich model, based on experimental results, is often more applicable when multiple types of sorption sites exist in parallel with different free energies and site abundances. The data was fit with the Langmuir (Equation 3) and Freundlich (Equation 4) models:

$$q_e = \frac{q_{max} K_L C_e}{1 + K_L C_e} \tag{3}$$

$$q_e = K_F C_e^{1/n} \tag{4}$$

where $C_e$ is the equilibrium concentration after treatment, $q_e$ is the amount adsorbed, $K_L$ is the Langmuir constant related to binding affinity, $q_{max}$ represents the number of surface sites, $K_F$ is the Freundlich capacity factor, and n is the Freundlich exponent. The sorption data in FIG. 7G suggests that the Langmuir isotherm may be more appropriate at this concentration range. Fit parameters for the Langmuir model are $q_{max}$ (14.55), K (0.04) and $R^2$ (0.98). Fit parameters for the Freundlich model are n (2.15), K (1.31) and $R^2$ (0.92)

The selectivity of the PEARL membrane was tested with real water samples from the Metropolitan Water Reclamation District of Greater Chicago, operator of seven treatment plants including one of the largest in the world. Effluent samples taken after secondary treatment from this POTW were tested in a batch set-up with the PEARL membrane.

Figure 7H:
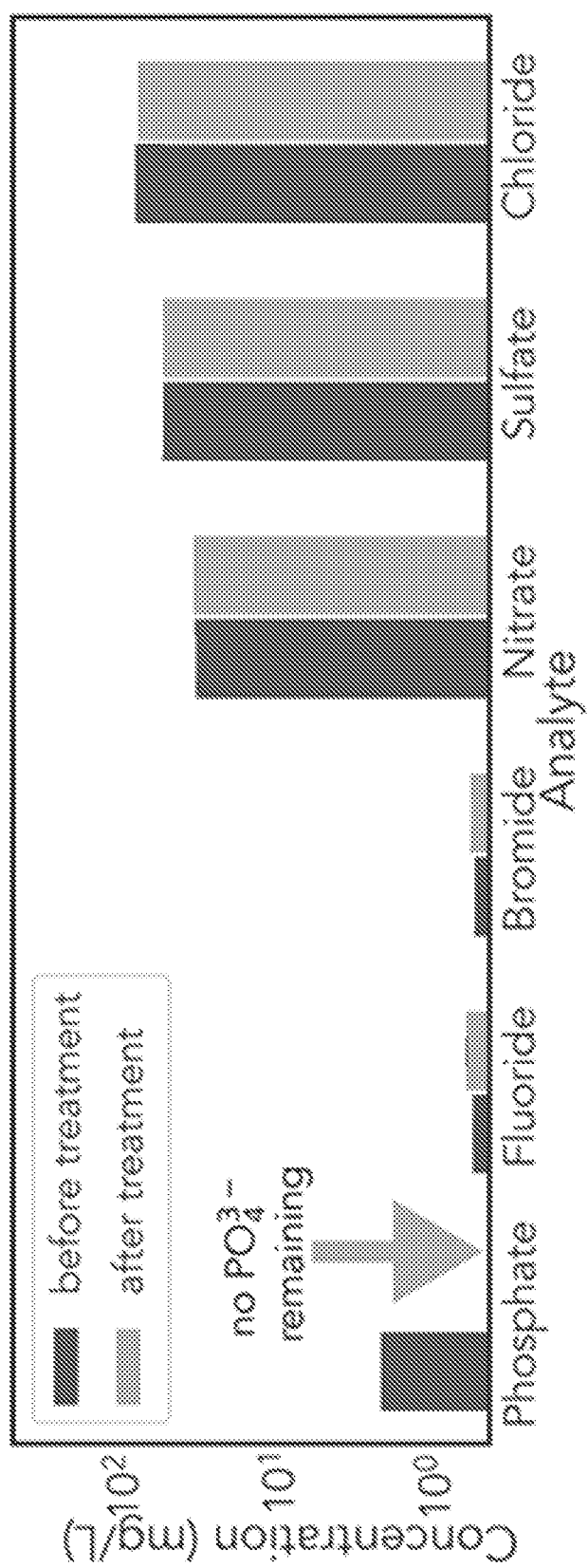
FIG. 7H shows the results of tests on POTW effluent samples, revealing selective binding.

These water samples have many dissolved ions that could potentially interfere with phosphate-nanoparticle binding. The samples had approximately 2 mg of $PO_4^{3-}$/L, and the PEARL membrane could nonetheless reduce the phosphate concentration below 20 μg of $PO_4^{3-}$/L (>99% remediation), without adsorbing other anions as shown in FIG. 7H. Up to 1 liter of sample was tested, bringing the concentration from 2.3 mg of $PO_4^{3-}$/L to below 20 μg of $PO_4^{3-}$/L (>99% remediation), illustrating the possibility of scaling this method beyond the bench top.

Crucially, the PEARL membrane did not alter the concentration of nitrates. As both nutrients contribute to hyper-eutrophication and the ratio of N to P is essential for maintaining ecosystem homeostasis, it is important to be able to capture anions independently. Because nitrate does not interfere with phosphate binding, this platform membrane approach could be extended to concurrent nitrate (or another dissolved anion) remediation with a different anchored nanostructure.

The Origin of the PEARL Membrane Performance

X-ray photoelectron spectroscopy (XPS) is a powerful tool to be able to probe the electronic structure of materials.

Because this technique provides optimal interpretability with materials of flat, uniform geometry, nanoparticles without cellulose were investigated using this method. Three samples were prepared (1) MNS: multifunctional nanostructures alone, (2) adsorb: MNS after adsorbing phosphates, and (3) desorb: MNS after phosphate has been desorbed with a NaOH solution. As a control, $KH_2PO_4$: potassium phosphate monobasic and NaOH: sodium hydroxide were also tested.

Figure 8A:
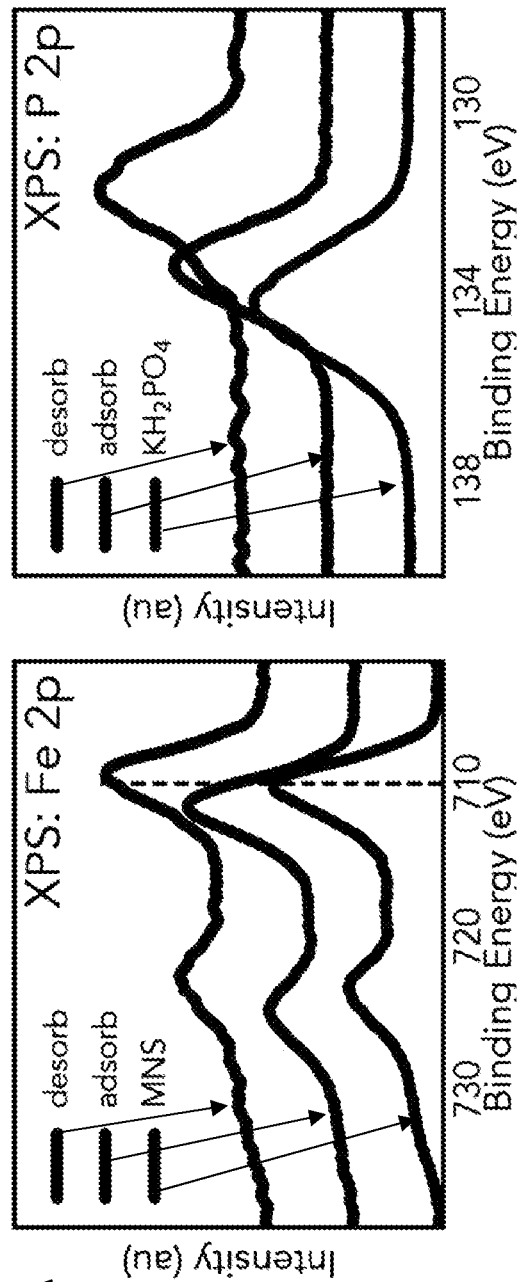

As shown in FIG. 8A, comparing the NP only sample and the adsorption sample, a shift in iron towards a more oxidized state was observed, which is expected if iron atoms bind with phosphate. After the phosphates were removed, the iron peak shifted to slightly lower binding energy than its original state. This suggests an irrecoverable change to the material after the first cycle. In FIG. 7E, higher phosphate recovery efficiency (95%) of the PEARL membrane after the first cycle was observed, which correlates with this XPS result.

Figure 8B:
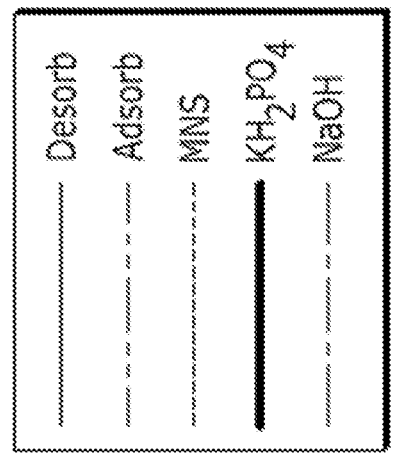
Figure 8C:
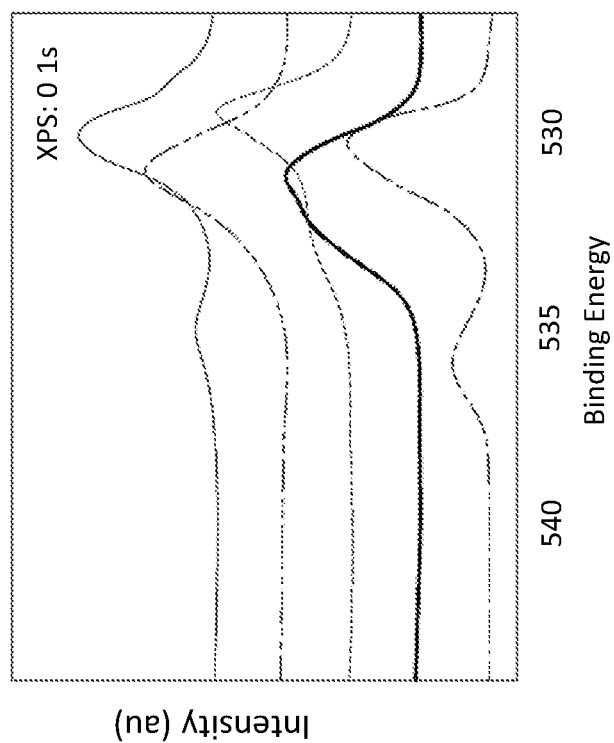

The changes to the phosphate peak (FIG. 8B) correspond with the changes to the iron peak. Compared to pure $KH_2PO_4$, the phosphorus moved to slightly lower energy when adsorbed on iron. After phosphates were desorbed, there nonetheless remained a small phosphorus peak, suggesting that some phosphorus cannot be removed with a basic solution. This phosphorus peak had a lower binding energy, which is a shift towards typical energies for phosphide compounds. This suggests that the phosphorus that is not recoverable has some degree of bonding that is more characteristic of phosphide complexes. The signals from the oxygen peak (FIG. 8C) are as expected summations of the $Fe_3O_4$, NaOH, and $KH_2PO_4$ signals.

One limitation of XPS is that the spot size is on the micron scale, while the binding mechanism of interest occurs on the molecular scale. Scanning Transmission Electron Microscopy (STEM) is a promising correlative technique, as it collects chemical and physical information about the sample on the atomic and nanoscale. The selected area electron diffraction (SAED) pattern from various regions of interest confirmed the $Fe_3O_4$ structure.

Such an area's electronic state can also be probed on the nanoscale with electron energy loss spectroscopy (EELS). In this study, a sample of nanoparticles after phosphate binding were studied (adsorb sample) with EELS. As shown in FIG. 8D, an iron M edge from the nanoparticles was observed. Despite the significant challenges in characterizing phosphorus, its L edge was clearly observed, as shown in FIG. 8E.

Thus, iron-phosphate bonding on the nanoscale was successfully confirmed. The phosphorus distribution in the sample was also mapped. There were some differences between the dark field, Fe, and P maps.

SUMMARY

Phosphate pollution, as with many environmental remediation challenges, plagues vast biospheres demanding a clean-up strategy that is effective, economically viable, and environmentally friendly. When developing a tool to sequester phosphates, the PEARL membrane was designed with these practical priorities in mind.

These examples demonstrate how the PEARL membrane can effectively remove >99% of phosphates from aqueous media at concentrations where conventional methods fail. This material was tested on complex POTW effluent samples to show the practicality and selectivity of this technology. Moreover, the PEARL membrane can be reused for multiple cycles to recover, not just eliminate, phosphates.

More broadly, this study serves as a demonstration of how a nanocomposite can bridge the gap between a nanostructure solution and an environmental problem on a gigaton scale. This unique architecture transforms a cheap, biocompatible, readily available porous material into an effective, deployable technology. This approach makes efficient use of materials, as it requires only a thin (5-10 weight %) coating of nanomaterials applied using water-based and scalable processes. Finally, because this platform technology is quite tunable, a similar cost-effective and sustainable approach can be employed to address other stewardship challenges.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the invention in various embodiments and with various modifications as suited to the particular use contemplated. It is intended that the scope of the disclosure be defined by the claims appended hereto and their equivalents.

What is claimed is:

1. A magnetic nanoparticle-coated porous material for recovering a contaminant from contaminated water, the coated porous material comprising a porous substrate having a solid matrix defining a plurality of pores distributed through the solid matrix and further comprising a coating comprising magnetic nanoparticles on surfaces of the solid matrix, wherein the coating is characterized by an average thickness corresponding to an average diameter of the magnetic nanoparticles.

2. The coated porous material of claim 1, wherein the magnetic nanoparticles comprise iron, iron oxide, or an alloy of iron or iron oxide.

3. The coated porous material of claim 1, wherein the magnetic nanoparticles are $Fe_3O_4$ nanoparticles.

4. The coated porous material of claim 1, wherein the magnetic nanoparticles have an average diameter in a range of from 10 nm to 200 nm.

5. The coated porous material of claim 1, wherein the solid matrix defines at least two sets of pores, the plurality of pores being among the at least two sets of pores, wherein the two sets of pores are characterized by different average diameters.

6. The coated porous material of claim 5, wherein pores of one of the two sets of pores have an average dimension in a range of from 1 mm to 10 mm.

7. The coated porous material of claim 1, wherein the solid matrix defines three sets of pores, the plurality of pores being among the three sets of pores, wherein the three sets of pores are characterized by different average diameters.

8. A magnetic nanoparticle-coated porous material for recovering a contaminant from contaminated water, the coated porous material comprising a porous substrate having a solid matrix defining a plurality of pores distributed through the solid matrix and further comprising a coating comprising magnetic nanoparticles on surfaces of the solid matrix, wherein the solid matrix defines three sets of pores, the plurality of pores being among the three sets of pores, wherein the three sets of pores are characterized by different average diameters, wherein pores of one of the three sets of pores have an average dimension in a range of from 1 mm to 10 mm; pores of another of the three sets have an average dimension in a range of from 1 µm to 1000 µm; and pores of another of the three sets have an average dimension in a range of from 1 nm to 1 µm.

9. The coated porous material of claim 1, wherein the solid matrix is composed of polyurethane, cellulose, melamine, polyimide, acrylic, polyamide, polyester, polycarbonate, polyaramide, or a combination thereof.

10. The coated porous material of claim 1, wherein the magnetic nanoparticles are not covalently bound to the solid matrix.

11. The coated porous material of claim 1, wherein the magnetic nanoparticles are $Fe_3O_4$ nanoparticles having an average diameter in a range of from 1 nm to 20 nm and the solid matrix is composed of an unfunctionalized hydrophilic polymer.

12. A method of recovering a contaminant from contaminated water, the method comprising contacting a coated porous material with contaminated water for a period of time to adsorb an amount of a contaminant from the contaminated water onto the coated porous material and provide the contaminated water with a reduced amount of the contaminant, wherein the contaminant is an inorganic compound selected from phosphate, a nitrate, or both, and further wherein the coated porous material comprises a porous substrate having a solid matrix defining a plurality of pores distributed through the solid matrix and further comprises a coating comprising magnetic nanoparticles on surfaces of the solid matrix.

13. A method of recovering a contaminant from contaminated water, the method comprising contacting a coated porous material with contaminated water for a period of time to adsorb an amount of a contaminant from the contaminated water onto the coated porous material and provide the contaminated water with a reduced amount of the contaminant, the method further comprising releasing the adsorbed contaminant from the coated porous material, wherein the releasing is accomplished by adjusting the pH of the coated porous material, and further wherein the coated porous material comprises a porous substrate having a solid matrix defining a plurality of pores distributed through the solid matrix and further comprises a coating comprising magnetic nanoparticles on surfaces of the solid matrix.

14. A method of recovering a contaminant from contaminated water, the method comprising contacting a coated porous material with contaminated water for a period of time to adsorb an amount of a contaminant from the contaminated water onto the coated porous material and provide the contaminated water with a reduced amount of the contaminant, the method further comprising releasing the adsorbed contaminant from the coated porous material, wherein the releasing is accomplished by exposing the coated porous material to a radio-frequency (RF) field for a period of time, and further wherein the coated porous material comprises a porous substrate having a solid matrix defining a plurality of pores distributed through the solid matrix and further comprises a coating comprising magnetic nanoparticles on surfaces of the solid matrix.

\* \* \* \* \*